US011533181B2

(12) United States Patent
Shirai

(10) Patent No.: US 11,533,181 B2
(45) Date of Patent: Dec. 20, 2022

(54) INFORMATION PROCESSING APPARATUS, REGISTRATION APPARATUS, INFORMATION PROCESSING METHOD, AND REGISTRATION METHOD

(71) Applicant: SONY CORPORATION, Tokyo (JP)

(72) Inventor: Taizo Shirai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 173 days.

(21) Appl. No.: 16/768,155

(22) PCT Filed: Oct. 3, 2018

(86) PCT No.: PCT/JP2018/037045
§ 371 (c)(1),
(2) Date: May 29, 2020

(87) PCT Pub. No.: WO2019/111513
PCT Pub. Date: Jun. 13, 2019

(65) Prior Publication Data
US 2020/0322164 A1     Oct. 8, 2020

(30) Foreign Application Priority Data
Dec. 8, 2017   (JP) .............................. JP2017-236037

(51) Int. Cl.
*H04L 29/06*        (2006.01)
*H04L 9/32*         (2006.01)
(Continued)

(52) U.S. Cl.
CPC .......... *H04L 9/3247* (2013.01); *H04L 9/0869* (2013.01); *H04L 9/14* (2013.01);
(Continued)

(58) Field of Classification Search
CPC ....... H04L 9/3247; H04L 9/0869; H04L 9/14; H04L 9/30; H04L 2209/38; H04L 2209/56; H04L 9/3239
See application file for complete search history.

(56) References Cited

U.S. PATENT DOCUMENTS 9,660,978 B1   5/2017   Truskovsky et al.
9,794,249 B1   10/2017  Truskovsky et al.
(Continued)

FOREIGN PATENT DOCUMENTS

CA     2981952 A1       10/2016
CN     101741545 A  *   6/2010
(Continued)

OTHER PUBLICATIONS

International Search Report and Written Opinion of PCT Application No. PCT/JP2018/037045, dated Dec. 25, 2018, 9 pages of ISRWO.

*Primary Examiner* — Joseph P Hirl
*Assistant Examiner* — Leynna Truvan
(74) *Attorney, Agent, or Firm* — Chip Law Group

(57) ABSTRACT

Provided is an information processing apparatus including: a generation section that generates, from secret keys corresponding to a plurality of respective algorithms, a plurality of public keys corresponding to the respective algorithms, a plurality of addresses corresponding to the respective algorithms, and a plurality of electronic signatures corresponding to the respective algorithms, by using the algorithms, at least one of the algorithms being an algorithm that is not solved in polynomial time; and a transmission control section that allows transaction data including the generated public keys, addresses, and electronic signatures to be transmitted to a P2P network.

11 Claims, 18 Drawing Sheets

(51) Int. Cl.
  *H04L 9/08* (2006.01)
  *H04L 9/14* (2006.01)
  *H04L 9/30* (2006.01)
  *H04L 9/00* (2022.01)
(52) U.S. Cl.
  CPC .................. *H04L 9/30* (2013.01); *H04L 9/50* (2022.05); *H04L 2209/56* (2013.01)

(56) References Cited

U.S. PATENT DOCUMENTS

2002/0108041 A1    8/2002  Watanabe et al.
2016/0300234 A1   10/2016  Moss-Pultz et al.

FOREIGN PATENT DOCUMENTS

| CN | 102195957 A | * | 9/2011 |
| CN | 107851284 A | | 3/2018 |
| EP | 3281171 A1 | | 2/2018 |
| JP | 2002-207427 A | | 7/2002 |
| JP | 2017-050763 A | | 3/2017 |
| JP | 2017-123116 A | | 7/2017 |
| JP | 2018-515048 A | | 6/2018 |
| SG | 11201708295 A | | 11/2017 |
| WO | 2016/164496 A1 | | 10/2016 |
| WO | 2018/027300 A1 | | 2/2018 |

* cited by examiner

FIG. 4A — SECRET KEY k

FIG. 4B — PUBLIC KEY K OBTAINED FROM k BY CALCULATION
K = G x k , G IS BASE POINT OF ELLIPTIC CURVE

FIG. 4C — BITCOIN ADDRESS A OBTAINED FROM K BY CALCULATION
A = 1J7mdg5rbQyUHENYdx39WVWK7fsLpEoXZy

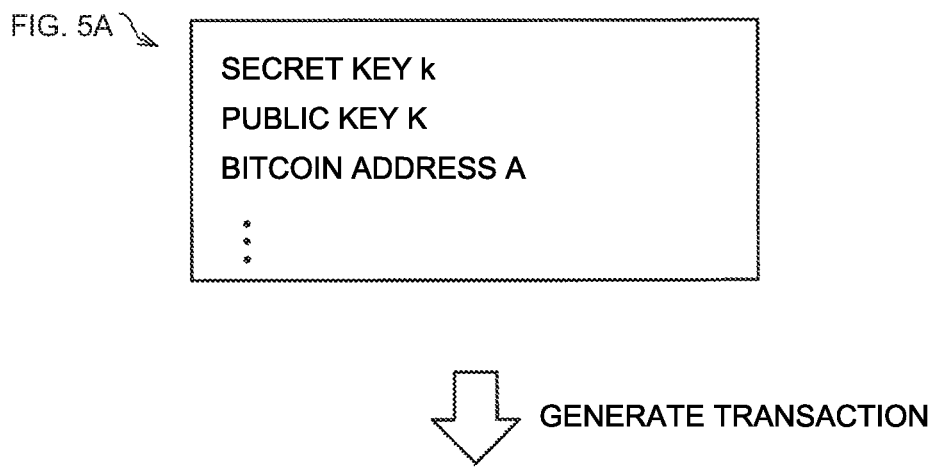
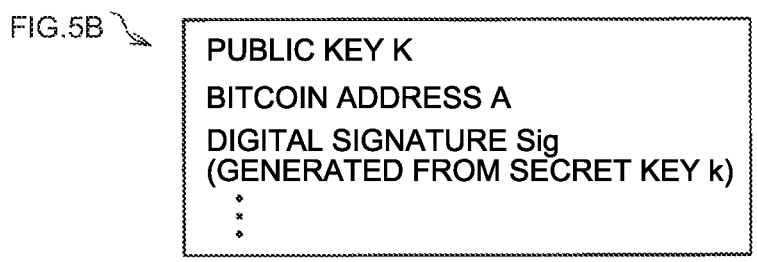

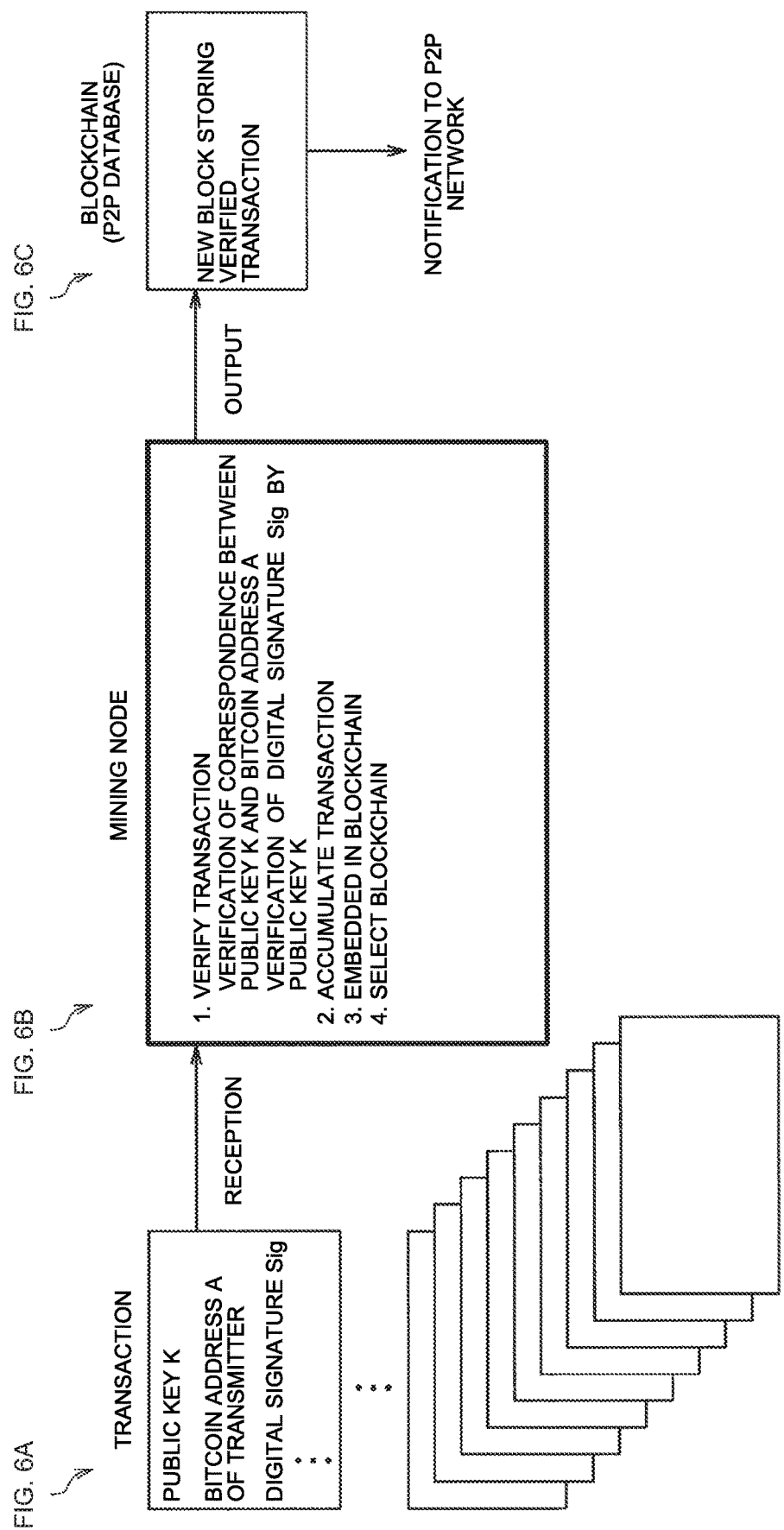

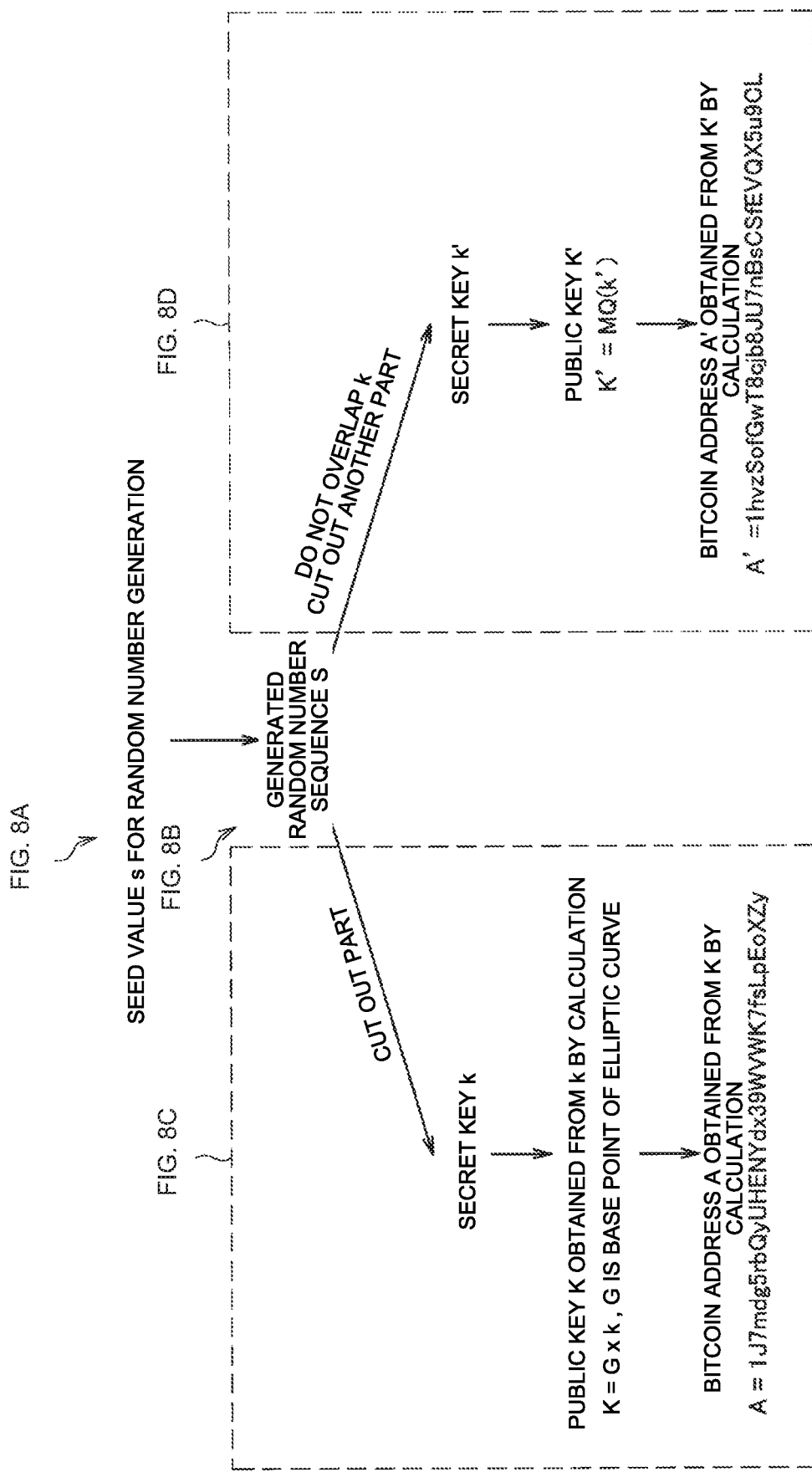

FIG. 9A

SEED VALUE s
SECRET KEYS k AND k'
PUBLIC KEYS K AND K'
BITCOIN ADDRESSES A AND A'
⋮

⇩ GENERATE TRANSACTION

FIG. 9B

PUBLIC KEYS K AND K'
BITCOIN ADDRESSES A AND A'
DIGITAL SIGNATURES Sig AND Sig'
(RESPECTIVELY GENERATED FROM
SECRET KEYS k and k')
⋮

FIG.10

|  | WHEN FIRST ALGORITHM IS SECURE | WHEN FIRST ALGORITHM HAS BEEN COMPROMISED | WHEN FIRST ALGORITHM HAS BEEN BROKEN |
|---|---|---|---|
| VERIFICATION OPERATION MODE 1 | ○ |  |  |
| VERIFICATION OPERATION MODE 2 | ○ | ○ |  |
| VERIFICATION OPERATION MODE 3 | ○ | ○ | ○ |

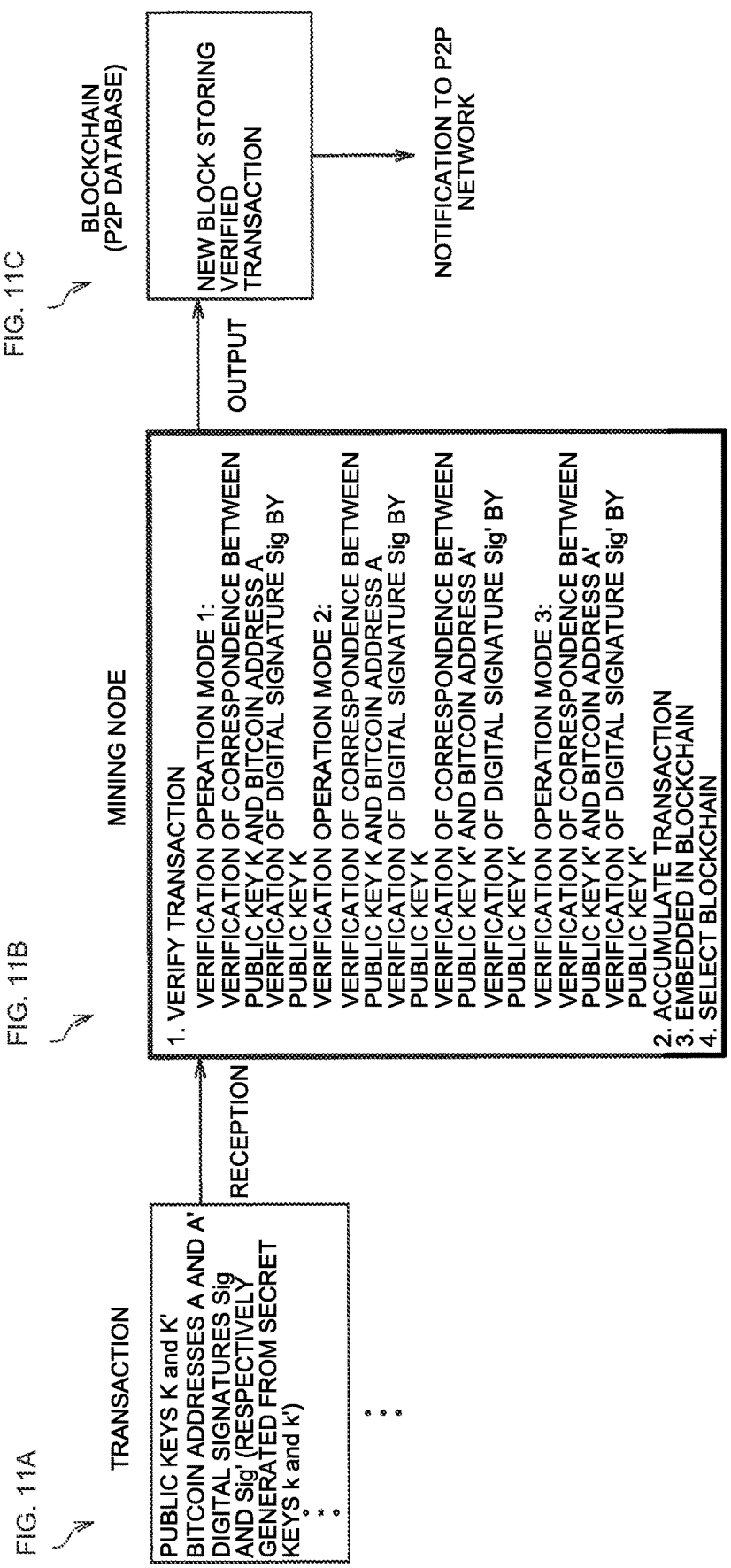

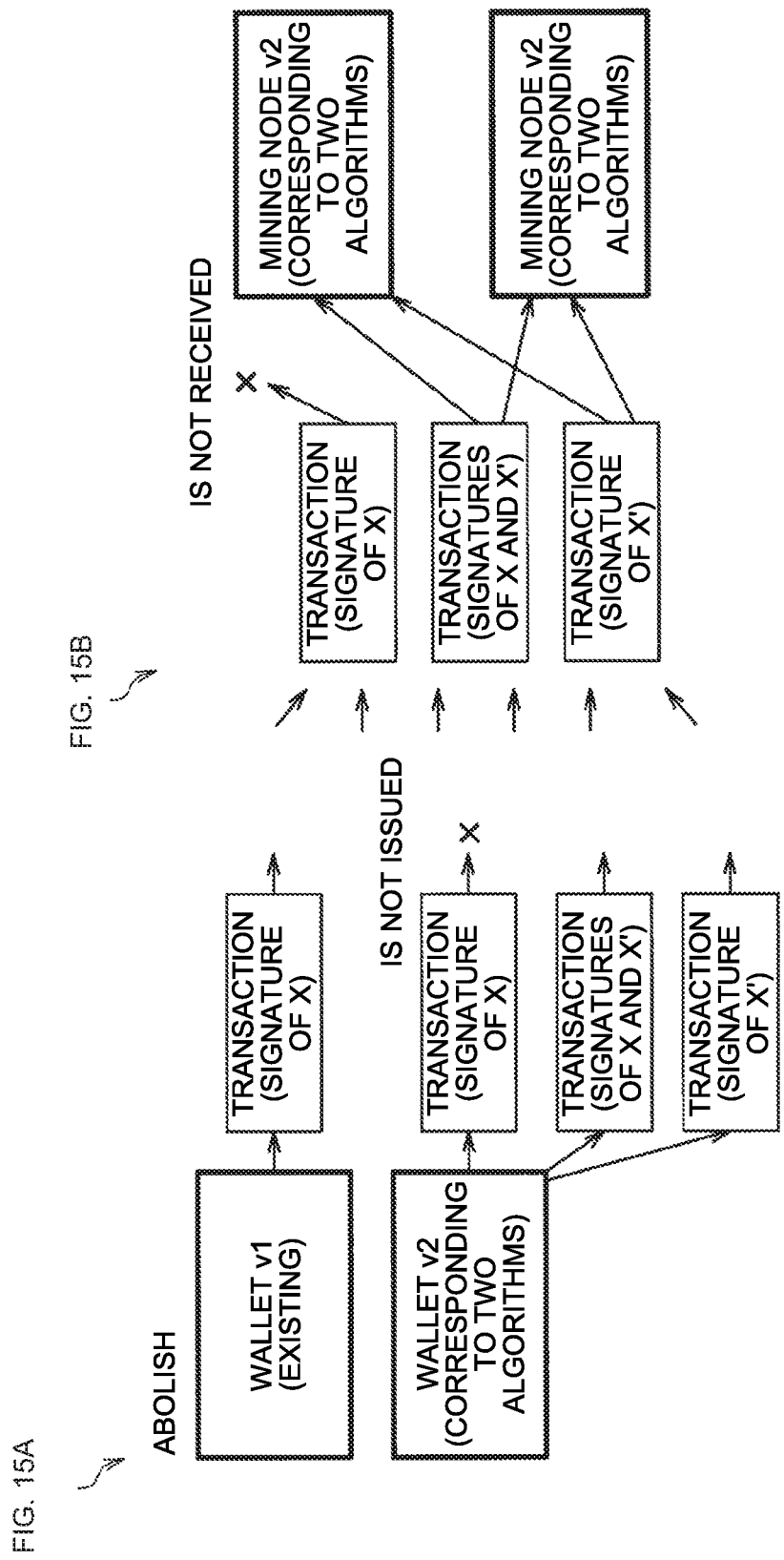

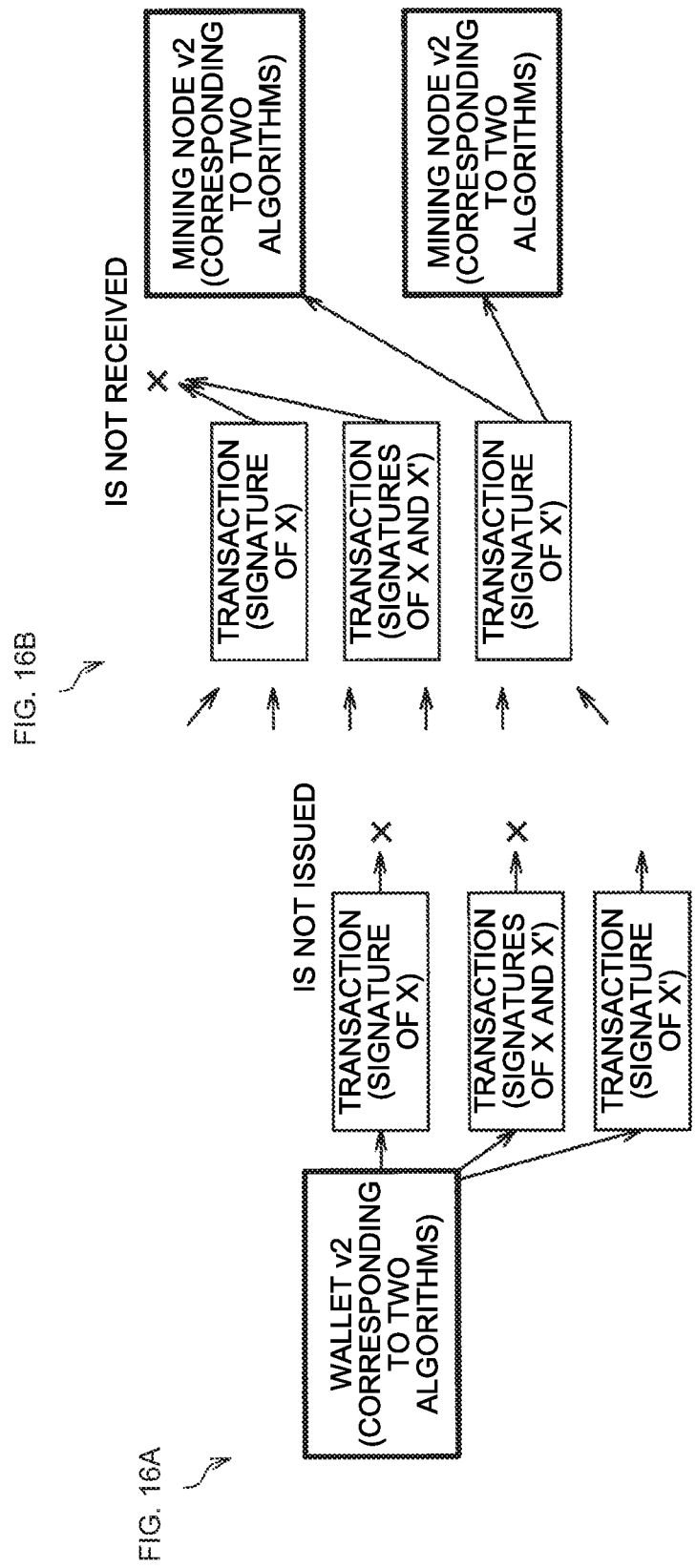

INFORMATION PROCESSING APPARATUS, REGISTRATION APPARATUS, INFORMATION PROCESSING METHOD, AND REGISTRATION METHOD

CROSS REFERENCE TO RELATED APPLICATIONS

This application is a U.S. National Phase of International Patent Application No. PCT/JP2018/037045 filed on Oct. 3, 2018, which claims priority benefit of Japanese Patent Application No. JP 2017-236037 filed in the Japan Patent Office on Dec. 8, 2017. Each of the above-referenced applications is hereby incorporated herein by reference in its entirety.

FIELD

The present disclosure relates to an information processing apparatus, a registration apparatus, an information processing method, a registration method, and a computer program.

BACKGROUND

In recent years, the use of peer-to-peer (P2P) networks capable of exchanging data of virtual currency such as Bitcoin and Ethereum has been increasing. Under such circumstances, a technology related to a blockchain used for a transaction of the virtual currency has been developed. As a technology related to a blockchain used for the transaction of the virtual currency, which uses two public key pairs including a public key for a digital signature and a public key for encryption, there is a technology disclosed in Patent Literature 1 below, for example.

CITATION LIST

Patent Literature

Patent Literature 1: JP 2017-50763 A

SUMMARY

Technical Problem

When a distributed file system using the P2P network such as the blockchain is used, for example, the following effects are obtained. Hereinafter, the distributed file system using the P2P network is referred to as a "P2P database".
Tampering & destruction are difficult.
Central management is not required (basically, anyone can participate).
High transparency (basically, anyone can view records).
Low cost (expensive system is not required).

For example, in the Bitcoin, an elliptic curve cryptography is used. The elliptic curve cryptography is not an algorithm that is not solved in polynomial time. Therefore, when a quantum computer (for example, a computer that implements parallelism by using quantum mechanical superposition) is used, encryption may be easily broken.

That is, in the P2P database using encryption using an algorithm that is not the algorithm that is not solved in the polynomial time, such as the elliptic curve cryptography, security is not always sufficiently ensured.

The present disclosure proposes a new and improved information processing apparatus, a registration apparatus, an information processing method, a registration method, and a computer program, by which it is possible to implement a more secure P2P database.

Solution to Problem

According to the present disclosure, an information processing apparatus is provided that includes: a generation section that generates, from secret keys corresponding to a plurality of respective algorithms, a plurality of public keys corresponding to the respective algorithms, a plurality of addresses corresponding to the respective algorithms, and a plurality of electronic signatures corresponding to the respective algorithms, by using the algorithms, at least one of the algorithms being an algorithm that is not solved in polynomial time; and a transmission control section that allows transaction data including the generated public keys, addresses, and electronic signatures to be transmitted to a peer-to-peer (P2P) network.

Moreover, according to the present disclosure, a registration apparatus is provided that includes: a verification section that verifies transaction data including a public key, an address, and an electronic signature transmitted from an external apparatus to a peer-to-peer (P2P) network; and a registration section that registers the verified transaction data in a P2P database, wherein the transaction data includes one or both of: a public key, an address, and an electronic signature generated from a secret key by using a first algorithm that is not an algorithm that is not solved in polynomial time; and a public key, an address, and an electronic signature generated from the secret key by using a second algorithm that is the algorithm that is not solved in the polynomial time.

Moreover, according to the present disclosure, an information processing method executed by an information processing apparatus is provided that includes the steps of: generating, from secret keys corresponding to a plurality of respective algorithms, a plurality of public keys corresponding to the respective algorithms, a plurality of addresses corresponding to the respective algorithms, and a plurality of electronic signatures corresponding to the respective algorithms, by using the algorithms, at least one of the algorithms being an algorithm that is not solved in polynomial time; and allowing transaction data including the generated public keys, addresses, and electronic signatures to be transmitted to a peer-to-peer (P2P) network.

Moreover, according to the present disclosure, a registration method executed by a registration apparatus is provided that includes: a step of verifying transaction data including a public key, an address, and an electronic signature transmitted from an external apparatus to a peer-to-peer (P2P) network; and a step of registering the verified transaction data in a P2P database, wherein the transaction data includes one or both of: a public key, an address, and an electronic signature generated from a secret key by using a first algorithm that is not an algorithm that is not solved in polynomial time; and a public key, an address, and an electronic signature generated from the secret key by using a second algorithm that is the algorithm that is not solved in the polynomial time.

Moreover, according to the present disclosure, a computer program is provided that causes a computer to perform: a function of generating, from secret keys corresponding to a plurality of respective algorithms, a plurality of public keys corresponding to the respective algorithms, a plurality of addresses corresponding to the respective algorithms, and a plurality of electronic signatures corresponding to the respective algorithms, by using the algorithms, at least one of the algorithms being an algorithm that is not solved in polynomial time; and a function of allowing transaction data including the generated public keys, addresses, and electronic signatures to be transmitted to a peer-to-peer (P2P) network.

Moreover, according to the present disclosure, a computer program causing a computer to perform: a function of verifying transaction data including a public key, an address, and an electronic signature transmitted from an external apparatus to a peer-to-peer (P2P) network; and a function of registering the verified transaction data in a P2P database, wherein the transaction data includes one or both of: a public key, an address, and an electronic signature generated from a secret key by using a first algorithm that is not an algorithm that is not solved in polynomial time; and a public key, an address, and an electronic signature generated from the secret key by using a second algorithm that is the algorithm that is not solved in the polynomial time.

Advantageous Effects of Invention

According to the present disclosure, it is possible to implement a more secure P2P database.

Note that the aforementioned effects are not always limited, and any of effects described in the present specification or other effects that can be understood from the present specification may be obtained together with or instead of the aforementioned effects.

BRIEF DESCRIPTION OF DRAWINGS

FIGS. 4A, 4B, and 4C are explanatory diagrams for explaining an example of the handling of keys in the P2P database.

FIGS. 5A and 5B are explanatory diagrams for explaining an example of the handling of keys in the P2P database.

FIGS. 6A, 6B, and 6C are explanatory diagrams illustrating an example of an operation of a mining node in an existing P2P network.

FIGS. 8A, 8B, 8C, and 8D are explanatory diagrams for explaining an example of a generation process according to an information processing method according to the present embodiment.

FIGS. 9A and 9B are explanatory diagrams for explaining an example of a transmission control process according to the information processing method according to the present embodiment.

FIG. 10 is an explanatory diagram illustrating an example of a relation between verification operation modes according to the present embodiment and a situation in which the verification operation modes are permitted.

FIGS. 11A, 11B, and 11C are explanatory diagrams illustrating an example of an operation of a registration apparatus according to the present embodiment.

FIGS. 15A and 15B are explanatory diagrams illustrating a fourth example of the operations of the apparatuses constituting the information processing system according to the present embodiment.

FIGS. 16A and 16B are explanatory diagrams illustrating a fifth example of the operations of the apparatuses constituting the information processing system according to the present embodiment.

DESCRIPTION OF EMBODIMENTS

Figure 1:
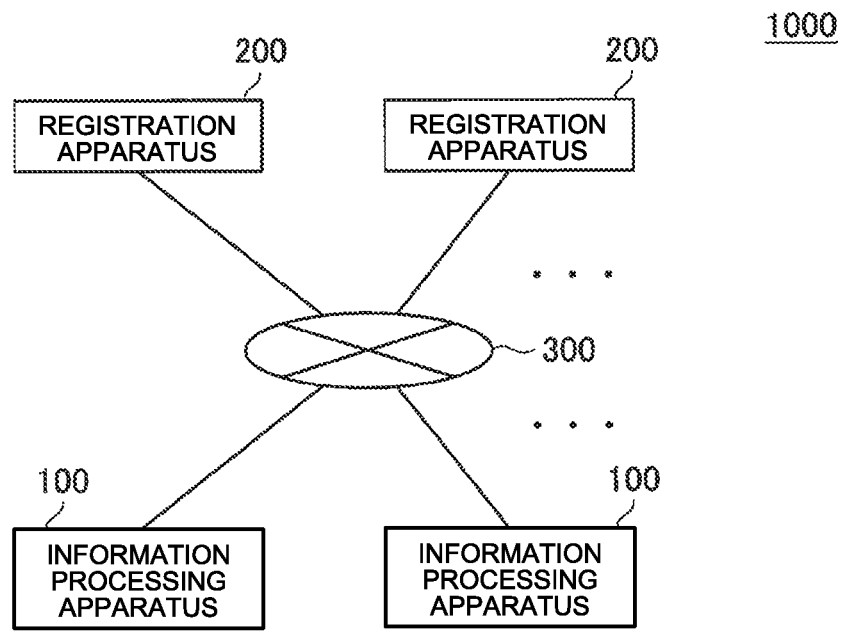
FIG. 1 is an explanatory diagram illustrating an example of a configuration of an information processing system according to an embodiment.

Hereinafter, preferred embodiments of the present disclosure will be described in detail with reference to the accompanying drawings. Note that in the present specification and the drawings, components having substantially the same functional configuration are denoted by the same reference numerals and redundant description thereof will be omitted.

Hereinafter, description will be made in the following order.

1. Information Processing System According to the Present Embodiment, Information Processing Method According to the Present Embodiment, and Registration Method According to the Present Embodiment

[1] Process in Existing P2P Network

[2] Configuration of Information Processing System according to the Present Embodiment and Process Performed in Apparatus Constituting Information Processing System

[3] Operation of Apparatus Constituting Information Processing System according to the Present Embodiment

[4] Configuration of Apparatus Constituting Information Processing System according to the Present Embodiment

[5] Example of Effect Obtained in Information Processing System according to the Present Embodiment 2. Computer Program According to the Present Embodiment
    (Information Processing System According to the Present Embodiment, Information Processing Method According to the Present Embodiment, and Registration Method According to the Present Embodiment)

The information processing system according to the present embodiment is a system capable of implementing a P2P database, and a P2P network is formed by constituent apparatuses.

The P2P database according to the present embodiment is the distributed file system using the P2P network as described above. The P2P database is, for example, blockchain data distributed through the P2P network. The blockchain data according to the present embodiment is, for example, blockchain data used for exchanging data of virtual currency such as Bitcoin and Ethereum. Note that the blockchain data according to the present embodiment is not limited to the blockchain data used for exchanging the data of the virtual currency. For example, the blockchain data according to the present embodiment may be blockchain data used for exchanging various data such as "education data (for example, data indicating a test result, a learning unit, and the like)", "content data such as music data and video data", and "data used for providing any service such as data indicating a flow of human traffic". That is, when the P2P database according to the present embodiment is used, it is possible to implement, for example, settlement using the virtual currency, exchange of the content data, provision of various services such as a stamp rally, and the like. Furthermore, the P2P database according to the present embodiment is not limited to the blockchain data, and may be any distributed file system capable of implementing the distributed file system using the P2P network.

Hereinafter, a case where the P2P database is Bitcoin blockchain data will be described as an example.

[1] Process in Existing P2P Network

Before describing the configuration of the information processing system according to the present embodiment and processes performed in apparatuses constituting the information processing system, processes in the existing P2P network will be described.

Figure 2:
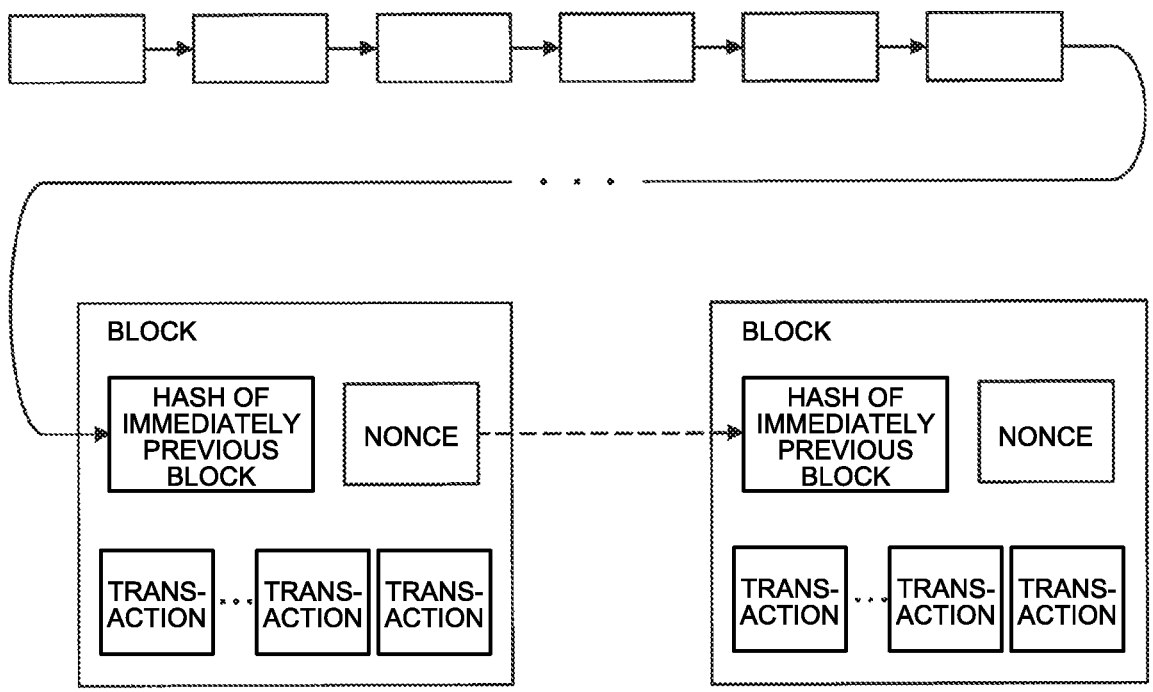
FIG. 2 is an explanatory diagram illustrating an example of a P2P database.

FIG. 2 is an explanatory diagram illustrating an example of the P2P database and illustrates an example of blockchain data.

As illustrated in FIG. 2, the blockchain data is data in which a plurality of blocks are connected like a chain. Each block includes data of one or two or more transactions. Furthermore, the data of the transaction is, for example, various data such as data indicating the content of a transaction, such as a value of traded virtual currency, and data indicating an address corresponding to a public key of a participant of a P2P network that generates a transaction (an apparatus constituting the P2P network; the same applies below). Note that the data included in the data of the transaction is not limited to the example described above. For example, the data of the transaction may include one or two or more data according to the use of the blockchain data such as education data, content data, and data used for providing a service, instead of or together with the data indicating the content of the aforementioned transaction. Hereinafter, the data of the transaction described above is referred to as "transaction data" or simply "transaction".

The blockchain data includes, for example, a hash of an immediately previous block and a value called nonce. The hash of the immediately previous block is used to determine whether it is a "correct block" that is correctly connected from the immediately previous block, for example. The nonce is used to prevent spoofing in identification using a hash, for example, and tampering is prevented using the nonce. The nonce includes, for example, data indicating a character string, a numeric string, or a combination thereof.

Furthermore, as will be described later, in the blockchain data, an electronic signature using an encryption key may be given to the transaction data, or encryption using an encryption key may be performed on the transaction data.

Each item of transaction data is made public and is shared in the entire P2P network. Note that the same record may not always be held in the entire P2P network depending on the type of the P2P database.

The addition of a new block (generation of the new block) to the blockchain data in the P2P network is performed by, for example, a method called Proof of Work (PoW) or a method called Proof of Stake (PoS). The PoW is a method in which a participant first having solved a mathematical problem (for example, a participant first having found a hash satisfying a specific condition) among participants of the P2P network generates a new block. Furthermore, the PoS is, for example, a method in which a participant first having solved a mathematical problem with a degree of difficulty varying depending on assets held by participants who are determined by the amount of virtual currency, the holding period of the virtual currency, and the like (for example, a participant first having found a hash satisfying a specific condition according to the degree of difficulty) generates a new block. Note that the method of adding a new block to the blockchain data in the P2P network according to the present embodiment is not particularly limited.

Processing according to the addition of the new block to the blockchain data is called mining. Furthermore, among the participants of the P2P network, a participant that performs the processing according to the addition of the new block to the blockchain data is called a miner. Hereinafter, a participant of the P2P network, other than the miner, may be referred to as a "node" and a node corresponding to the miner may be referred to as a "mining node".

Figure 3:
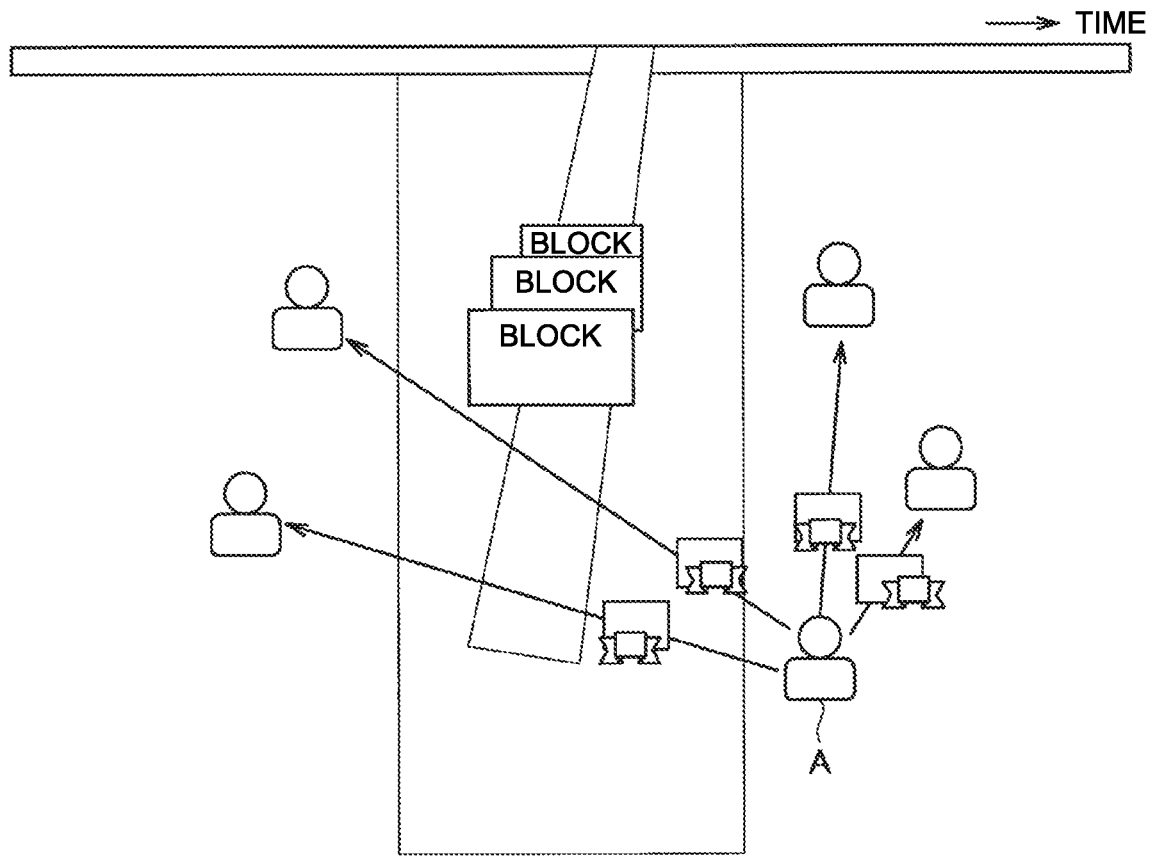
FIG. 3 is an explanatory diagram illustrating an example of registration of data to the P2P database in a P2P network.

FIG. 3 is an explanatory diagram illustrating an example of registration of data to the P2P database in the P2P network, and illustrates an example of registration of data to the blockchain data (an example of the P2P database).

For example, a participant A of the P2P network performs an electronic signature on data, which is registered in the blockchain data, by using a secret key of the participant A. By performing the electronic signature on the data, which is registered in the blockchain data, by using a secret key of the participant A, for example, it is guaranteed that the data is data originating from the participant A and the holder of the data is the participant A. Furthermore, the participant A of the P2P network may encrypt the data, which is registered in the blockchain data, by using a public key and the like of the participant A. Needless to say, when data is registered in the P2P database, the electronic signature using a secret key or encryption using a public key and the like may not be performed.

When the electronic signature is performed, the participant A broadcasts transaction data, which includes the data subjected to the electronic signature, on the P2P network. The transaction data broadcast on the P2P network is included in blocks generated by any participant of the P2P network and is registered in the blockchain data.

Note that the method of registering data in the P2P database in the P2P network is not limited to the example described above. For example, in the P2P network, it is also possible to register data in the P2P database by using a sidechain technology.

FIGS. 4A, 4B, 5A, and 5B are explanatory diagrams for explaining an example of the handling of keys in the P2P database, and illustrate the handling of keys in Bitcoin. FIGS. 4A and 4B illustrate an example of a structure of generating a Bitcoin address A from a secret key k. Furthermore, FIGS. 5A and 5B illustrate an example of a transaction generated based on the secret key k, a public key K, the Bitcoin address A, and the like.

The secret key k is generated by generating, for example, a random number (FIG. 4A). The secret key k is, for example, a 256-bit integer represented by 64 hexadecimal numbers as illustrated in the following example.

.k=
1E99423A4ED27608A15A2616A2B0E9E52CED330AC5 30EDCC32C8FFC6A52 6AEDD

The public key K is generated by the calculation of the following Equation 1 using the secret key k (FIG. 4B). Here, "G" illustrated in the following Equation 1 is a base point of an elliptic curve.

$$K = G \times k \quad \text{(Equation 1)}$$

As an example, the public key K includes, for example, the following example.
K=(x,y)
x=F028892BAD7ED57D2FB57BF33081D5CFCF6F9ED3 D3D7F159C2E2FFF579DC341A
y=07CF33DA18BD734C600B96A72BBC4749D5141C90E C8AC328AE52DDFE2E505BDB The Bitcoin address A is generated using, for example, the public key K (FIG. 4C). More specifically, the Bitcoin address A is, for example, a character string obtained by converting RIPEMD160 (SHA256(K)) by Base58Check and adding 1 to the head. As an example, the Bitcoin address A includes, for example, the following example.
A=1J7mdg5rbQyUHENYdx39WVWK7fsLpEoXZy For example, the secret key k, the public key K, and the Bitcoin address A generated as described above are stored in the wallet of the Bitcoin. The wallet of the Bitcoin is, for example, various formats such as a software wallet (a wallet on a computer; sometimes called a desktop wallet), a web wallet (a wallet on a network), a paper wallet (a wallet printed on a paper), and a hardware wallet (a device dedicated for the wallet).

Transaction data is generated based on the secret key K the public key K, and the Bitcoin address A. As illustrated in FIGS. 5A and 5B, the transaction data includes a digital signature Sig generated based on the public key K, the Bitcoin address A, and the secret key k. The digital signature Sig is generated by, for example, multiplying data (for example, Bitcoin transaction data and the like) by the secret key k.

FIGS. 6A, 6B, and 6C are explanatory diagrams illustrating an example of an operation of a mining node in the existing P2P network.

The mining node that has received transaction data (FIG. 6A) transmitted from each node performs each processing illustrated in FIG. 6B.

For example, the mining node verifies the transaction data by performing "verification of correspondence between the public key K and the Bitcoin address A included in the transaction data" and "verification of correspondence between the public key K and the digital signature Sig included in the transaction data".

The mining node accumulates the transaction data that has been normally verified, and performs processing according to addition of a new block to blockchain data at a predetermined timing (for example, every 10 minutes). When the processing according to the addition of the new block to the blockchain data is successful, the mining node adds a new block storing the transaction data that has been normally verified to a blockchain (an example of the P2P database) as illustrated in FIG. 6C. Then, the mining node notifies the P2P network of the addition of the new block.

The mining node in the existing P2P network performs, for example, an operation as illustrated with reference to FIGS. 6A, 6B, and 6C.

Figure 7:
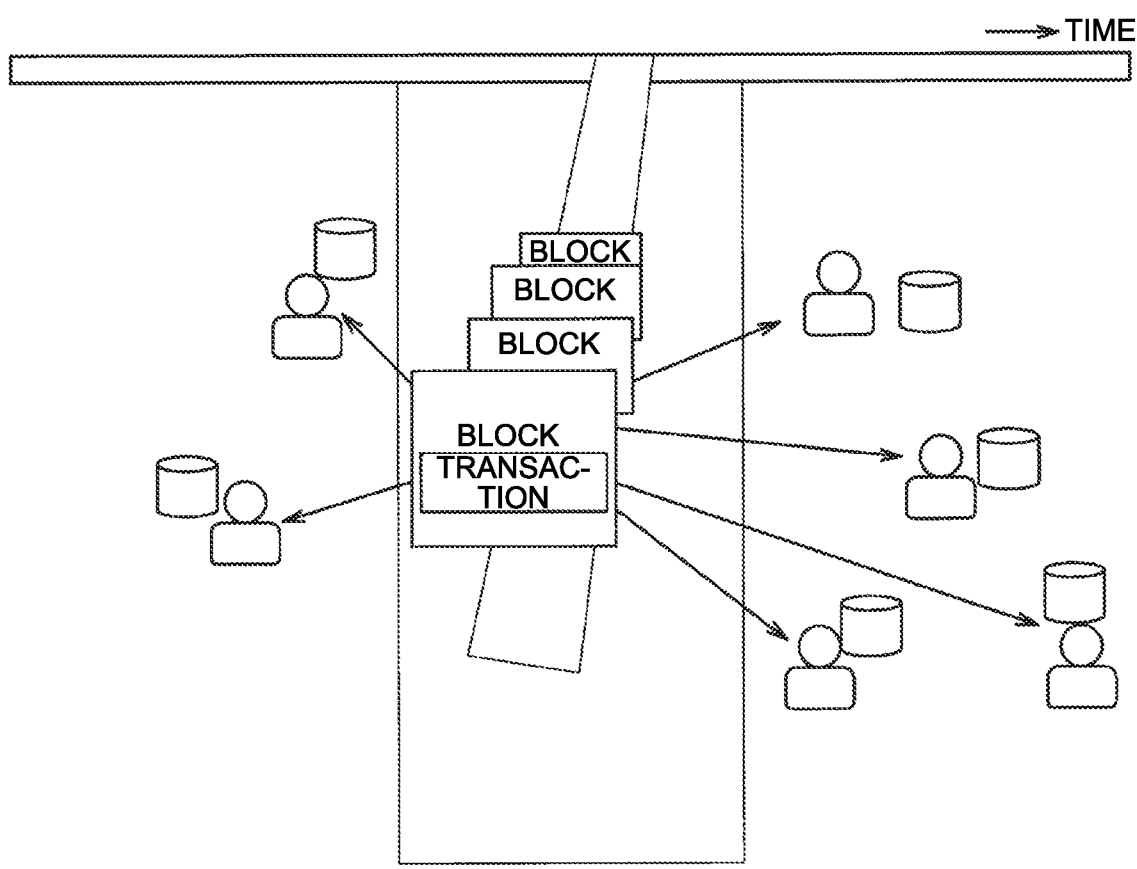
FIG. 7 is an explanatory diagram illustrating an example of acquisition of data from the P2P database in the P2P network.

FIG. 7 is an explanatory diagram illustrating an example of acquisition of data from the P2P database in the P2P network, and illustrates an example of acquisition of data from the blockchain data (an example of the P2P database).

Data, which is registered in the blockchain data by a participant of the P2P network, is registered in the blockchain data as described with reference to FIG. 3, for example. As a consequence, the registered data is shared by all the participants of the P2P network, for example. Thus, each of the participants of the P2P network can acquire the data stored in the blockchain data and registered in the blockchain data by the participant of the P2P network, by referring to the blockchain data stored in a recording medium relevant to each participant, for example.

Note that the same record may not always be held in the entire P2P network depending on the type of the P2P database as described above. In the above case, the data registered in the blockchain data by the participant of the P2P network is shared by some of the participants of the P2P network and some participants can acquire the registered data by referring to the blockchain data stored in the corresponding recording medium.

Furthermore, for example, when an electronic signature using a secret key is performed on the data registered in the blockchain data, a participant having acquired the registered data can verify the validity of the acquired registered data by using a public key corresponding to the secret key. Furthermore, for example, when the data registered in the blockchain data is encrypted using a public key, the participant having acquired the registered data decrypts the acquired registered data by using a secret key corresponding to the public key.

[2] Configuration of Information Processing System According to the Present Embodiment and Process Performed in Apparatus Constituting Information Processing System Next, while an example of the configuration of the information processing system according to the present embodiment is described, processes performed in apparatuses constituting the information processing system (processes according to the information processing method according to the present embodiment or processes according to the registration method according to the present embodiment) will be described.

FIG. 1 is an explanatory diagram illustrating an example of a configuration of an information processing system 1000 according to the present embodiment. The information processing system 1000 has, for example, information processing apparatuses 100 and registration apparatuses 200.

The information processing apparatuses 100 and the registration apparatuses 200 are connected by, for example, one or both of a wireless manner and a wired manner, thereby configuring a network 300. The network 300 is, for example, a P2P network to which various apparatuses constituting the information processing system 1000 are connected in an autonomous and distributed manner. Note that the network 300 is not limited to the P2P network and may be any distributed network.

Note that the information processing system according to the present embodiment is not limited to the example illustrated in FIG. 1.

For example, the number of the information processing apparatuses 100 configuring the network 300 in FIG. 1 and the number of the registration apparatuses 200 configuring the network 300 in FIG. 1 are examples and the number of various apparatuses configuring the network 300 is not limited to the example illustrated in FIG. 1.

Furthermore, the information processing apparatus 100 and the registration apparatus 200 are illustrated as separate apparatuses in FIG. 1; however, some or all of the information processing apparatuses 100 configuring the network 300 and some or all of the registration apparatuses 200 configuring the network 300 may serve as the information processing apparatuses 100 and the registration apparatuses 200 as an integrated apparatus.

Hereinafter, apparatuses constituting the information processing system according to the present embodiment will be described using the information processing system 1000 illustrated in FIG. 1 as an example.

[2-1] Information Processing Apparatus 100

The information processing apparatus 100 is an apparatus serving as a node of the P2P network. The information processing apparatus 100 performs processes according to the information processing method according to the present embodiment and plays a role of transmitting transaction data to the P2P network, in the information processing system 1000.

As described above, in the P2P database using encryption using an algorithm that is not an algorithm that is not solved in polynomial time, such as elliptic curve cryptography, safety may not be always sufficiently ensured.

In this regard, the information processing apparatus 100 performs a generation process illustrated in (1) below and a transmission control process illustrated in (2) below as the processes according to the information processing method according to the present embodiment.

(1) Generation Process

The information processing apparatus 100 generates a plurality of public keys, a plurality of addresses, and a plurality of electronic signatures by using each of a plurality of algorithms in which at least one algorithm is the algorithm that is not solved in the polynomial time. That is, the algorithms include the algorithm that is not solved in the polynomial time.

The algorithm that is not solved in the polynomial time according to the present embodiment includes at least one of a multivariate quadratic (MQ) algorithm, an NTRU algorithm, an unbalanced oil and vinegar (UOV) algorithm, an XMSS algorithm, and a McEliece algorithm. Needless to say, the example of the algorithm that is not solved in the polynomial time is not limited to the example described above.

Hereinafter, a case where the algorithm that is not solved in the polynomial time is the MQ algorithm will be described as an example. The MQ algorithm is an algorithm using a problem of solving a multivariate quadratic polynomial (MQ problem), and is used for identification and the like. An example of a technology according to an identification scheme using the MQ algorithm (method based on the MQ problem) includes a technology disclosed in the following Non-Patent Literature.

Koichi Sakumoto, Taizo Shirai, Harunaga Hiwatari: Public-Key Identification Schemes Based on Multivariate Quadratic Polynomials, CRYPTO 2011

Furthermore, the address according to the present embodiment is data capable of specifying a location in the P2P network. The address according to the present embodiment is, for example, a Bitcoin address, an Ethereum wallet address, and the like. Hereinafter, a case where in which the address according to the present embodiment is the Bitcoin address will be described as an example.

The information processing apparatus 100 generates, from secret keys corresponding to a plurality of respective algorithms, a plurality of public keys corresponding to the respective algorithms, a plurality of addresses corresponding to the respective algorithms, and a plurality of electronic signatures corresponding to the respective algorithms.

The secret keys corresponding to the respective algorithms are generated based on one seed value. The seed value is stored in a recording medium, such as a read-only memory (ROM) and a storage unit (which will be described later) provided in the information processing apparatus 100, for example. Furthermore, the seed value may be stored in a tamper-resistant recording medium.

The information processing apparatus 100 generates a random number sequence from the one seed value and cuts out a different part for each algorithm from the generated random number sequence, thereby generating the secret keys corresponding to the respective algorithms. That is, the secret keys corresponding to the respective algorithms are different for the respective algorithms.

As described above, the secret keys corresponding to the respective algorithms are generated based on the one seed value, so that it is possible to suppress an increase in a key size and to more easily perform encryption key management and address management. Furthermore, by suppressing the increase in the key size and more easily performing the encryption key management and the address management, the application to a small device such as a wearable device used by being worn on the body becomes easier.

Needless to say, the information processing apparatus 100 can generate the same secret key with a plurality of algorithms. For example, the information processing apparatus 100 generates the secret key by cutting out the same part from a random number sequence generated from one seed value, or uses a random number sequence generated from one seed value as the secret key.

FIGS. 8A, 8B, and 8C are explanatory diagrams for explaining an example of the generation process according to the information processing method according to the present embodiment. FIGS. 8A, 8B, and 8C illustrate an example of generating, from one seed value s, "public key K and Bitcoin address A corresponding to the elliptic curve cryptography algorithm that is not the algorithm that is not solved in the polynomial time" and "public key K' and Bitcoin address A' corresponding to the MQ algorithm that is the algorithm that is not solved in the polynomial time".

The information processing apparatus 100 generates a random number sequence S from the seed value s (FIGS. 8A and 8B).

The information processing apparatus 100 cuts out a part of the random number sequence S and uses the cut-out part as a secret key k.

Then, the information processing apparatus 100 generates the public key K and the Bitcoin address A from the secret key k, similarly to the example illustrated in FIGS. 4A, 4B, and 4C (FIG. 8C). Although not illustrated in FIG. 8C the information processing apparatus 100 generates a digital signature Sig by multiplying data (for example, Bitcoin transaction data and the like) by the secret key k.

Furthermore, the information processing apparatus 100 cuts out a part, which is different from the secret key k, from the random number sequence S, and uses the cut-out part as a secret key k' (FIG. 8D). For example, the information processing apparatus 100 cuts out a part, which does not overlap the secret key k, from the random number sequence S, and uses the cut-out part as the secret key k'. Note that the information processing apparatus 100 may cut out a part, which partially overlaps the secret key k, from the random number sequence S, and use the cut-out part as the secret key k'. When determining the secret key k and the secret key k', a selection is made such that it is not possible to restore the secret key k' from the secret key k and it is not possible to restore the secret key k from the secret key k'. Furthermore, the secret key k and the secret key k' are not limited to being obtained by being cut out from the random number sequence S generated from the seed value s. For example, the secret key k and the secret key k' may be obtained by being cut out from two generated independent random numbers. The independent random numbers are stored in the recording medium, such as the ROM and the storage unit (which will be described later) provided in the information processing apparatus 100, similarly to the seed value s, for example.

Then, the information processing apparatus 100 generates the public key K' by the calculation of the following Equation 2 using the secret key k' (FIG. 8D). Here, "MQ ( )" expressed in Equation 1 below is a function of an MQ signature scheme.

$$K'=MQ(k') \qquad \text{(Equation 2)}$$

The information processing apparatus 100 generates the Bitcoin address A' by using the public key K' (FIG. 8D). The information processing apparatus 100 converts RIPEMD160 (SHA256(K')) by Base58Check and uses a character string, in which 1 is added to the head, as the Bitcoin address A', similarly to the Bitcoin address A illustrated in FIG. 8C. As an example, the Bitcoin address A' includes, for example, the following example.

.A'=1hvzSofGwT8cjb8JU7nBsCSfEVQX5u9CL

Furthermore, although not illustrated in FIG. 8D, the information processing apparatus 100 generates a digital signature Sig' by multiplying data (for example, Bitcoin transaction data and the like) by the secret key k'.

For example, as illustrated with reference to FIGS. 8A, 8B, 8C, and 8D, based on the one seed value, the information processing apparatus 100 generates "secret key k, public key K, and Bitcoin address A corresponding to the elliptic curve cryptography algorithm" and "secret key k', public key K', and Bitcoin address A' corresponding to the MQ algorithm".

Note that, in the example illustrated with reference to FIGS. 8A, 8B, 8C, and 8D, an example is illustrated in which the public key, the Bitcoin address, and the digital signature corresponding to each of the two algorithms, namely the elliptic curve cryptography algorithm and the MQ algorithm, are generated; however, an example of the generation process in the information processing apparatus 100 is not limited to the example described above. For example, the information processing apparatus 100 may generate the public key, the Bitcoin address, and the digital signature corresponding to each of three or more algorithms including the algorithm that is not solved in the polynomial time.

For example, the secret key, the public key, and the Bitcoin address generated as described above are stored in the wallet of the Bitcoin. Furthermore, the digital signature is generated as described above when the transaction data is generated, for example. Needless to say, the generation timing of the digital signature is not limited to a timing at which the transaction data is generated.

Note that the generation process according to the present embodiment is not limited to the example described above. For example, the information processing apparatus 100 may generate the public key, the address, and the digital signature by using an algorithm corresponding to set generation operation modes.

Generation operation modes according to the present embodiment include, for example, the following first generation operation mode to third generation operation mode.

First generation operation mode: operation mode of generating only a public key, an address, and an electronic signature corresponding to an algorithm (hereinafter, may be referred to as a "first algorithm") that is not the algorithm that is not solved in the polynomial time Second generation operation mode: operation mode of generating both "a public key, an address, and an electronic signature corresponding to the first algorithm" and "a public key, an address, and an electronic signature corresponding to an algorithm (hereinafter, may be referred to as a "second algorithm") that is the algorithm that is not solved in the polynomial time"

Third generation operation mode: operation mode of generating only a public key, an address, and an electronic signature corresponding to the second algorithm The generation operation modes according to the present embodiment are set based on, for example, an operation on an operation device constituting an operation unit (which will be described later) provided in the information processing apparatus 100 or an external operation device, based on a signal received via the network 300 and the like, or by executing a "computer program that automatically executes a set process when a set condition is satisfied" registered in the P2P database. The "computer program that automatically executes the set process when the set condition is satisfied" corresponds to an agent program for executing only a structure of an automatic contract called a smart contract.

Furthermore, in the information processing apparatus 100, the generation operation modes may be set by updating a computer program for executing the processes according to the information processing method according to the present embodiment.

Hereinafter, a case where the information processing apparatus 100 operates in the first generation operation mode may be indicated as "wallet v1". Furthermore, hereinafter, a case where the information processing apparatus 100 operates in the second generation operation mode may be indicated as "wallet v2", and a case where the information processing apparatus 100 operates in the third generation operation mode may be indicated as "wallet v3".

The information processing apparatus 100 can perform the generation process corresponding to the set generation operation mode, thereby implementing a more secure P2P database while having affinity with the existing P2P network. In other words, when performing the generation process corresponding to the set generation operation mode, the information processing apparatus 100 has upward compatibility with the existing P2P network.

(2) Transmission Control Process

The information processing apparatus 100 allows transaction data including the public keys, the addresses, and the electronic signatures generated in the above process (1) (generation process) to be transmitted to the P2P network.

For example, when the process corresponding to the generation operation mode is performed in the above process (1) (generation process), the information processing apparatus 100 allows transaction data including the public key, the address, and the electronic signature generated corresponding to the generation operation mode to be transmitted to the P2P network. In such a case, the information processing apparatus 100 may allow generation operation mode identification information (for example, an ID indicating the generation operation mode, and the like), which indicates that the process corresponding to which generation operation mode has been performed, to be included in transaction data to be transmitted.

The information processing apparatus 100 controls a communication device constituting a provided communication unit (which will be described later) or an external communication unit to transmit the transaction data to the P2P network.

FIGS. 9A and 9B are explanatory diagrams for explaining an example of the transmission control process according to the information processing method according to the present embodiment.

For example, as illustrated in FIGS. 9A and 9B, the information processing apparatus 100 generates transaction data including the public keys K and K', the Bitcoin addresses A and A', and the digital signatures Sig and Sig' generated in the above process (1) (generation process). Then, the information processing apparatus 100 allows the transaction data to be transmitted to the P2P network.

The information processing apparatus 100 performs, for example, the above process (1) (generation process) and the above process (2) (transmission control process) as the processes according to the information processing method according to the present embodiment, thereby transmitting the transaction data to the P2P network.

Note that the above process (1) (generation process) and the above process (2) (transmission control process) are obtained by dividing the processes according to the information processing method according to the present embodiment for the purpose of convenience. Thus, each process according to the information processing method according to the present embodiment can also be regarded, for example, as one process, or two or more processes divided by any dividing method.

[2-2] Registration Apparatus 200

The registration apparatus 200 is an apparatus serving as a mining node in the P2P network. In the information processing system 1000, the registration apparatus 200 performs the processes according to the registration method according to the present embodiment, verifies transaction data, and plays a role of registering the verified transaction data in the P2P database.

The registration apparatus 200 performs a verification process illustrated in the following (I) and a registration process illustrated in the following (II) as the processes according to the registration method according to the present embodiment.

(I) Verification Process

The registration apparatus 200 verifies the transaction data transmitted from an external apparatus such as the information processing apparatus 100 to the P2P network.

As illustrated in the description of the generation operation modes in the information processing apparatus 100, the transaction data to be verified includes one or both of "the public key, the address, and the electronic signature generated from the secret key by using the first algorithm (algorithm that is not the algorithm that is not solved in the polynomial time)" and "the public key, the address, and the electronic signature generated from the secret key by using the second algorithm (algorithm that is not solved in the polynomial time)".

For example, as described with reference to FIGS. 6A, 6B, and 6C, the registration apparatus 200 verifies the transaction data by performing the "verification of correspondence between the public key and the Bitcoin address included in the transaction data" and the "verification of correspondence between the public key and the digital signature included in the transaction data".

Furthermore, the registration apparatus 200 may perform verification by a method corresponding to set verification operation modes, for example.

The verification operation modes according to the present embodiment include, for example, the following first verification operation mode to third verification operation mode.

First verification operation mode: verification operation mode of verifying each of the address and the electronic signature corresponding to the first algorithm based on the public key corresponding to the first algorithm Second verification operation mode: verification operation mode of verifying each of the address and the electronic signature corresponding to the first algorithm based on the public key corresponding to the first algorithm and verifying each of the address and the electronic signature corresponding to the second algorithm based on the public key corresponding to the second algorithm Third verification operation mode: verification operation mode of verifying each of the address and the electronic signature corresponding to the second algorithm based on the public key corresponding to the second algorithm The verification operation modes according to the present embodiment are set based on, for example, an operation on an operation device constituting an operation unit (which will be described later) provided in the registration apparatus 200 or an external operation device, based on a signal received via the network 300 and the like, or by executing a "computer program that automatically executes a set process when a set condition is satisfied" registered in the P2P database.

Furthermore, in the registration apparatus 200, the verification operation modes may be set by updating a computer program for executing the processes according to the registration method according to the present embodiment.

Hereinafter, a case where the registration apparatus 200 operates in the first verification operation mode may be indicated as "mining node v1". Furthermore, hereinafter, a case where the registration apparatus 200 operates in the second verification operation mode may be indicated as "mining node v2", and a case where the registration apparatus 200 operates in the third verification operation mode may be indicated as "mining node v3".

FIG. 10 is an explanatory diagram illustrating an example of a relation between the verification operation modes according to the present embodiment and a situation in which the verification operation modes are permitted.

For example, in a situation in which the first algorithm (algorithm that is not the algorithm that is not solved in the polynomial time) is secure, all the verification operation modes of the first verification operation mode, the second verification operation mode, and the third verification operation mode are permitted.

Furthermore, for example, in a situation in which the first algorithm has been compromised, the second verification operation mode and the third verification operation mode are permitted. The compromise herein means that the first algorithm has not been actually broken, but there is a security concern. Furthermore, the fact that the first algorithm has been broken means that it is actually possible to solve a problem of the first algorithm. As an example of the compromise situation, it is known to break the algorithm, but it is not actually possible to break the algorithm (for example, because it takes an enormous amount of time).

Furthermore, for example, in a situation in which the first algorithm has been broken, only the third verification operation mode is permitted.

When performing verification by a method corresponding to the verification operation mode set as described above, the registration apparatus 200 may not verify transaction data not corresponding to the set verification operation mode.

For example, based on the generation operation mode identification information included in the transaction data, the registration apparatus 200 determines whether the transaction data is the transaction data not corresponding to the verification operation mode, and selectively performs verification. In an example in which no verification is performed, in a case where the second verification operation mode or the third verification operation mode has been set, when the generation operation mode identification information indicates the first generation operation mode, the registration apparatus 200 does not verify the transaction data. Needless to say, the example in which no verification is performed is not limited to the example described above.

Furthermore, the registration apparatus 200 may determine whether the transaction data is the transaction data not corresponding to the verification operation mode based on a relation with another registration apparatus 200 constituting the information processing system 1000, and selectively perform verification.

An example in which the registration apparatus 200 does not verify the transaction data not corresponding to the set verification operation mode will be described in examples of the operations of the apparatuses constituting the information processing system 1000 to be described later.

(II) Registration Process

The registration apparatus 200 registers the verified transaction data in the P2P database.

FIGS. 11A, 11B, and 11C are explanatory diagrams illustrating an example of the operation of the registration apparatus 200 according to the present embodiment.

The registration apparatus 200 having received transaction data (FIG. 11A) transmitted from each node performs each process illustrated in FIG. 11B.

The registration apparatus 200 verifies the transaction data. At this time, the registration apparatus 200 performs the verification by a method corresponding to the set verification operation mode.

When the first verification operation mode has been set, the registration apparatus 200 performs "verification of correspondence between the public key K and the Bitcoin address A included in the transaction data" and "verification of correspondence between the public key K and the digital signature Sig included in the transaction data", similarly to the verification in the mining node illustrated in FIGS. 6A 6B, and 6C.

Furthermore, when the second verification operation mode has been set, the registration apparatus 200 performs "verification of correspondence between the public key K' and the Bitcoin address A' included in the transaction data" and "verification of correspondence between the public key K' and the digital signature Sig' included in the transaction data", in addition to the verification when the first verification operation mode has been set.

Furthermore, when the third verification operation mode has been set, the registration apparatus 200 performs "verification of correspondence between the public key K' and the Bitcoin address A' included in the transaction data" and "verification of correspondence between the public key K' and the digital signature Sig' included in the transaction data".

Note that, when the second verification operation mode has been set, the registration apparatus 200 may perform a process similar to the case where the first verification operation mode has been set or a process similar to the case where the third verification operation mode has been set, based on transaction data to be verified.

Similarly to the verification in the mining node illustrated in FIGS. 6A, 6B, and 6C, the registration apparatus 200 accumulates the transaction data that has been normally verified, and performs a process according to the addition of a new block to the Blockchain data at a predetermined timing (for example, every 10 minutes). When the process according to the addition of the new block to the Blockchain data is successful, the registration apparatus 200 adds the new block storing the transaction data that has been normally verified to the Blockchain (an example of the P2P database) as illustrated in FIG. 11C, similarly to the verification in the mining node illustrated in FIGS. 6A, 6B, and 6C. Then, similarly to the verification in the mining node illustrated in FIGS. 6A, 6B, and 6C, the registration apparatus 200 notifies the P2P network of the addition of the new block.

The registration apparatus 200 performs the operation as illustrated with reference to FIGS. 11A, 11B, and 11C, for example.

Note that the registration process in the registration apparatus 200 is not limited to the example described above.

For example, the registration apparatus 200 may register the transaction data, which includes the verification operation mode identification information (for example, an ID indicating the verification operation mode, and the like) indicating that the process corresponding to which verification operation mode has been performed, in the P2P database. By registering the verification operation mode identification information in the P2P database, whether verification has been performed using which algorithm is recorded in a form that is difficult to tamper.

The registration apparatus 200 performs, for example, the above process (I) (verification process) and the above process (II) (registration process) as the processes according to the registration method according to the present embodiment, thereby verifying the transaction data and registering the verified transaction data in the P2P database.

Note that the above process (I) (verification process) and the above process (II) (registration process) are obtained by dividing the processes according to the registration method according to the present embodiment for the purpose of convenience. Thus, each process according to the registration method according to the present embodiment can also be regarded, for example, as one process, or two or more processes divided by any dividing method.

[3] Operation of Apparatus Constituting Information Processing System According to the Present Embodiment As described above, the information processing apparatus 100 can perform the processes according to the set generation operation modes and the registration apparatus 200 can perform the processes according to the set verification operation modes. Next, examples of the operations of the information processing apparatus 100 and the registration apparatus 200 according to a combination of the operation modes will be described.

Hereinafter, the first algorithm that is not the algorithm that is not solved in the polynomial time is referred to as an "algorithm X". Furthermore, hereinafter, the second algorithm that is the algorithm that is not solved in the polynomial time is referred to as an "algorithm X'".

(A) First Example of Operation of Apparatus Constituting Information Processing System 1000

Figure 12B:
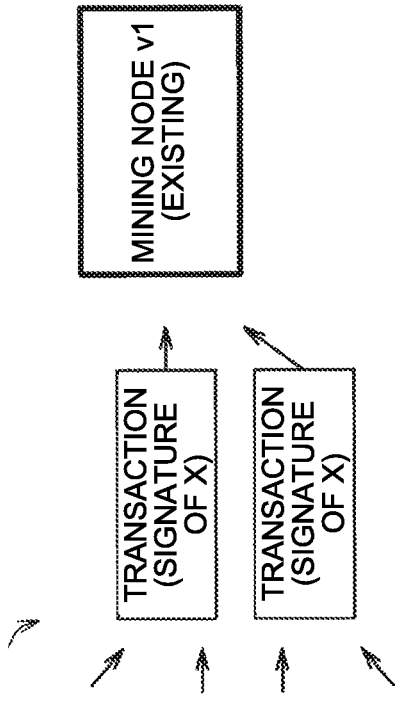
FIGS. 12A and 12B are explanatory diagrams illustrating a first example of operations of apparatuses constituting the information processing system according to the present embodiment.
Figure 12A:
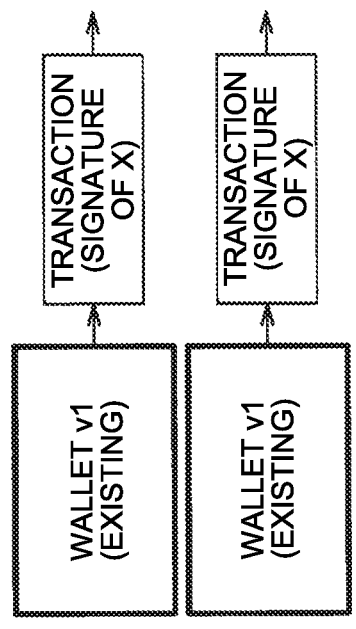

FIGS. 12A and 12B are explanatory diagrams illustrating a first example of the operations of the apparatuses constituting the information processing system 1000 according to the present embodiment. FIG. 12A illustrates an example of the operation of the information processing apparatus 100 in which the first generation operation mode has been set. Furthermore, FIG. 12B illustrates an example of the operation of the registration apparatus 200 in which the first verification operation mode has been set.

FIGS. 12A and 12B illustrate an example of an operation in a case where both the information processing apparatus 100 and the registration apparatus 200 correspond to only one type of algorithm called the algorithm X (first algorithm). That is, FIGS. 12A and 12B corresponds to the operation in the existing P2P network.

(B) Second Example of Operation of Apparatus Constituting Information Processing System 1000

Figure 13A:
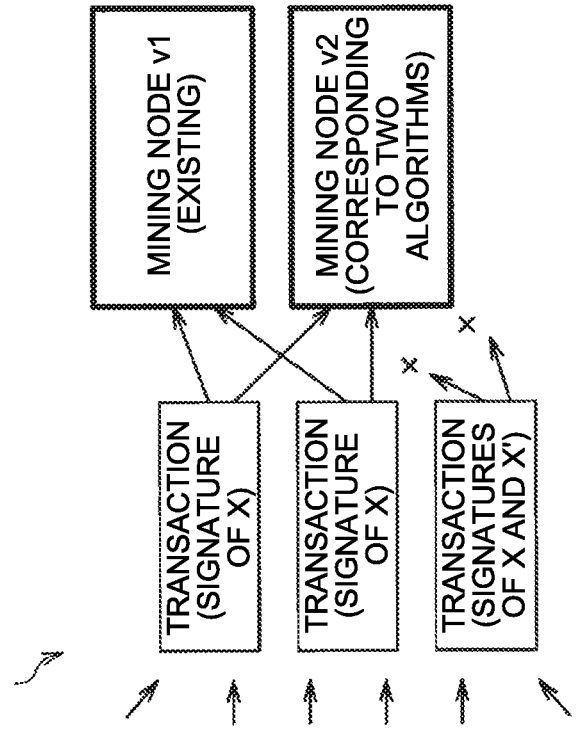
FIGS. 13A and 13B are explanatory diagrams illustrating a second example of the operations of the apparatuses constituting the information processing system according to the present embodiment.
Figure 13B:
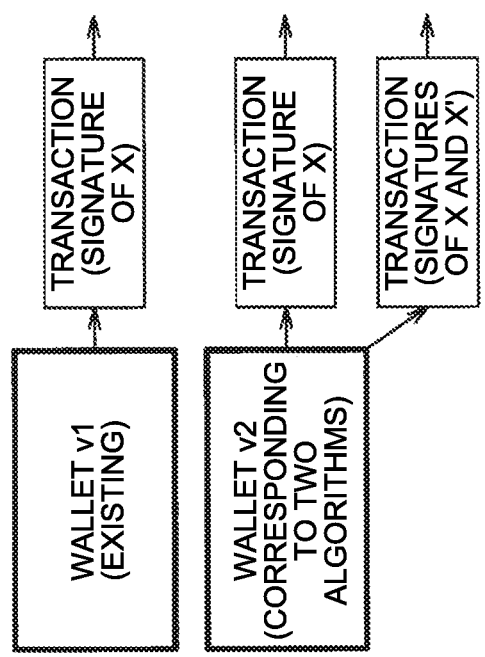

FIGS. 13A and 13B are explanatory diagrams illustrating a second example of the operations of the apparatuses constituting the information processing system 1000 according to the present embodiment. FIGS. 13A and 13B illustrate a case where the algorithm X (first algorithm) is in a secure state and the second verification operation mode has been set in some of the registration apparatuses 200 constituting the information processing system 1000.

FIG. 13A illustrates an example of the operation of the information processing apparatus 100 in which the first generation operation mode has been set and an example of the operation of the information processing apparatus 100 in which the second generation operation mode has been set. Furthermore, FIG. 13B illustrates an example of the operation of the registration apparatuses 200 in which the first verification operation mode has been set and an example of the operation of the registration apparatuses 200 in which the second verification operation mode has been set.

In the case of the state of the second example illustrated in FIGS. 13A and 13B, in the registration apparatuses 200 in which the second verification operation mode has been set, only transaction data corresponding to only one type of algorithm called the algorithm X (first algorithm) is processed. The operation illustrated in FIGS. 13A and 13B corresponds to, for example, an operation in a preparation period for transition of the operation mode in the information processing system 1000.

(C) Third Example of Operation of Apparatus Constituting Information Processing System 1000

Figure 14A:
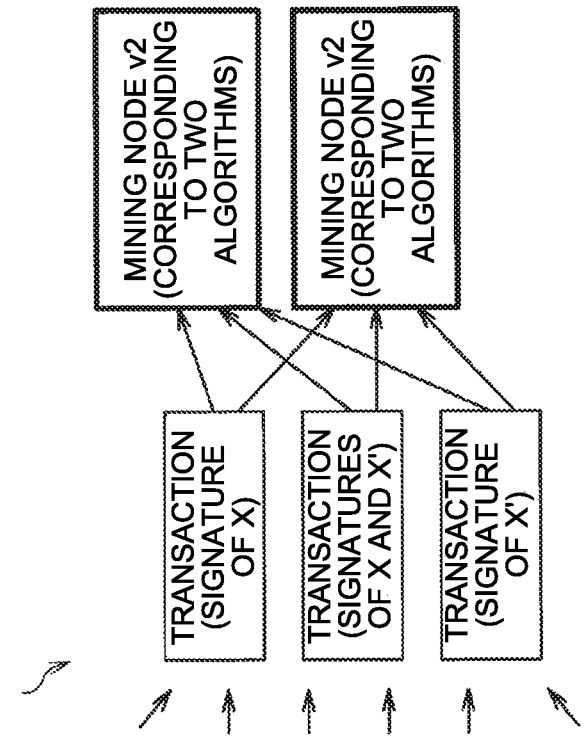
FIGS. 14A and 14B are explanatory diagrams illustrating a third example of the operations of the apparatuses constituting the information processing system according to the present embodiment.
Figure 14B:
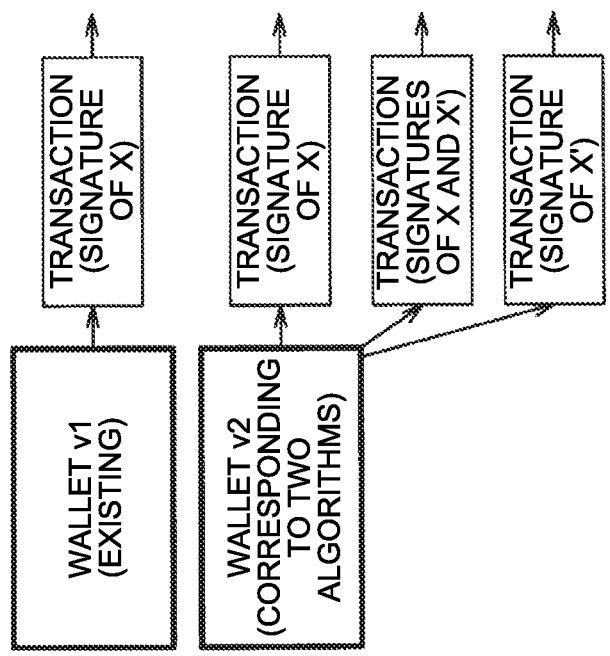

FIGS. 14A and 14B are explanatory diagrams illustrating a third example of the operations of the apparatuses constituting the information processing system 1000 according to the present embodiment. FIGS. 14A and 14B illustrate a case where the algorithm X (first algorithm) is in a secure state and the second verification operation mode has been set in a sufficient number of registration apparatuses 200 among the registration apparatuses 200 constituting the information processing system 1000.

FIG. 14A illustrates an example of the operation of the information processing apparatus 100 in which the first generation operation mode has been set and an example of the operation of the information processing apparatus 100 in which the second generation operation mode has been set. Furthermore, FIG. 14B illustrates an example of the operation of the registration apparatuses 200 in which the second verification operation mode has been set.

In the state of the third example illustrated in FIGS. 14A and 14B, the registration apparatuses 200 performs the following operation.

In a case where transaction data to be verified is data corresponding to only the algorithm X (first algorithm), the registration apparatuses 200 verifies the transaction data, similarly to the case where the first verification operation mode has been set.

In a case where transaction data to be verified is data corresponding to the algorithm X (first algorithm) and the algorithm X' (second algorithm), the registration apparatuses 200 verifies the transaction data in the second verification operation mode.

In a case where transaction data to be verified is data corresponding to only the algorithm X' (second algorithm), the registration apparatuses 200 verifies the transaction data, similarly to the case where the third verification operation mode has been set.

(D) Fourth Example of Operation of Apparatus Constituting Information Processing System 1000

FIGS. 15A and 15B is an explanatory diagram illustrating a fourth example of the operations of the apparatuses constituting the information processing system 1000 according to the present embodiment. FIGS. 15A and 15B illustrate a case where the algorithm X (first algorithm) is in a compromised state and the second verification operation mode has been set in a sufficient number of registration apparatuses 200 among the registration apparatuses 200 constituting the information processing system 1000.

A of FIG. 15A illustrates an example of the operation of the information processing apparatus 100 in which the first generation operation mode has been set and an example of the operation of the information processing apparatus 100 in which the second generation operation mode has been set. Furthermore, FIG. 15B illustrates an example of the operation of the registration apparatuses 200 in which the second verification operation mode has been set.

In the state of the fourth example illustrated in FIGS. 15A and 15B, the information processing apparatus 100, in which the second generation operation mode has been set, performs the following operation.

The information processing apparatus 100 transmits transaction data including both data corresponding to the first algorithm and data corresponding to the second algorithm.

The information processing apparatus 100 does not transmit transaction data including only data corresponding to the first algorithm.

Furthermore, in the state of the fourth example illustrated in FIGS. 15A and 15B, the registration apparatuses 200 performs the following operation.

In a case where transaction data to be verified is data corresponding to only the algorithm X (first algorithm), the registration apparatuses 200 does not process the transaction data. That is, in the registration apparatuses 200, the operation when the first verification operation mode has been set is prohibited.

In a case where transaction data to be verified is data corresponding to the algorithm X (first algorithm) and the algorithm X' (second algorithm), the registration apparatuses 200 verifies the transaction data in the second verification operation mode.

In a case where transaction data to be verified is data corresponding to only the algorithm X' (second algorithm), the registration apparatuses 200 verifies the transaction data, similarly to the case where the third verification operation mode has been set.

(E) Fifth Example of Operation of Apparatus Constituting Information Processing System 1000

FIGS. 16A and 16B are explanatory diagrams illustrating a fifth example of the operations of the apparatuses constituting the information processing system 1000 according to the present embodiment. FIGS. 16A and 16B illustrate a case where the compromise of the algorithm X (first algorithm) is serious or the algorithm X has been broken, and the second verification operation mode has been set in a sufficient number of registration apparatuses 200 among the registration apparatuses 200 constituting the information processing system 1000.

A of FIG. 16A illustrates an example of the operation of the information processing apparatus 100 in which the second generation operation mode has been set. Furthermore, FIG. 16B illustrates an example of the operation of the registration apparatuses 200 in which the second verification operation mode has been set.

In the state of the fifth example illustrated in FIGS. 16A and 16B, the registration apparatuses 200 performs the following operation. That is, in the case where the compromise of the algorithm X (first algorithm) is serious or the algorithm X has been broken, the process of transaction data including data corresponding to the algorithm X is prohibited in the registration apparatuses 200.

In a case where transaction data to be verified is data corresponding to only the algorithm X (first algorithm), the registration apparatuses 200 does not process the transaction data. That is, in the registration apparatuses 200, the operation when the first verification operation mode has been set is prohibited.

In a case where transaction data to be verified is data corresponding to the algorithm X (first algorithm) and the algorithm X' (second algorithm), the registration apparatuses 200 does not process the transaction data. That is, in the registration apparatuses 200, the operation when the second verification operation mode has been set is prohibited.

In a case where transaction data to be verified is data corresponding to only the algorithm X' (second algorithm), the registration apparatuses 200 verifies the transaction data, similarly to the case where the third verification operation mode has been set.

(F) Sixth Example of Operation of Apparatus Constituting Information Processing System 1000

Figure 17A:
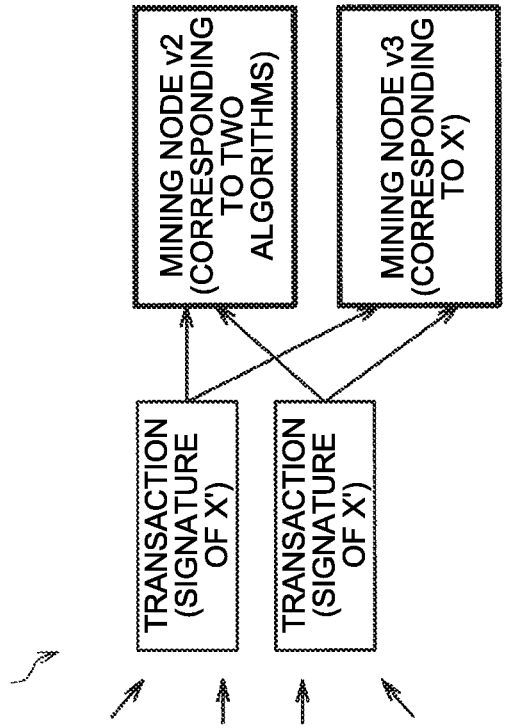
FIGS. 17A and 17B are explanatory diagrams illustrating a sixth example of the operations of the apparatuses constituting the information processing system according to the present embodiment.
Figure 17B:
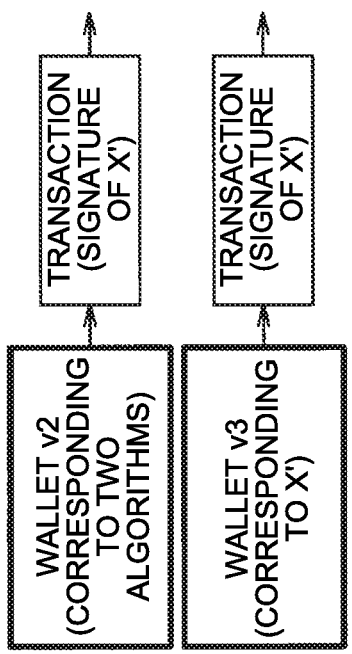

FIGS. 17A and 17B is an explanatory diagram illustrating a sixth example of the operations of the apparatuses constituting the information processing system 1000 according to the present embodiment. FIGS. 17A and 17B illustrate a "case where the second generation operation mode or the third generation operation mode has been set in a sufficient number of information processing apparatuses 100 among the information processing apparatuses 100 constituting the information processing system 1000 and the second verification operation mode or the third verification operation mode has been set in a sufficient number of registration apparatuses 200 among the registration apparatuses 200 constituting the information processing system 1000".

FIG. 17A illustrates an example of the operation of the information processing apparatus 100 in which the second generation operation mode has been set and an example of the operation of the information processing apparatus 100 in which the third generation operation mode has been set. Furthermore, FIG. 17B illustrates an example of the operation of the registration apparatuses 200 in which the second verification operation mode has been set and an example of the operation of the registration apparatuses 200 in which the third verification operation mode has been set.

In the state of the sixth example illustrated in FIGS. 17A and 17B, the information processing apparatus 100 performs the following operation.

The information processing apparatus 100 transmits transaction data including only data corresponding to the second algorithm.

Furthermore, in the state of the sixth example illustrated in FIGS. 17A and 17B, the registration apparatuses 200 performs the following operation.

In a case where transaction data to be verified is data corresponding to only the algorithm X' (second algorithm), the registration apparatuses 200 verifies the transaction data, similarly to the case where the third verification operation mode has been set.

In a case where transaction data to be verified is not the data corresponding to only the algorithm X' (second algorithm), the registration apparatuses 200 does not process the transaction data.

(G) Seventh Example of Operation of Apparatus Constituting Information Processing System 1000

Figure 18A:
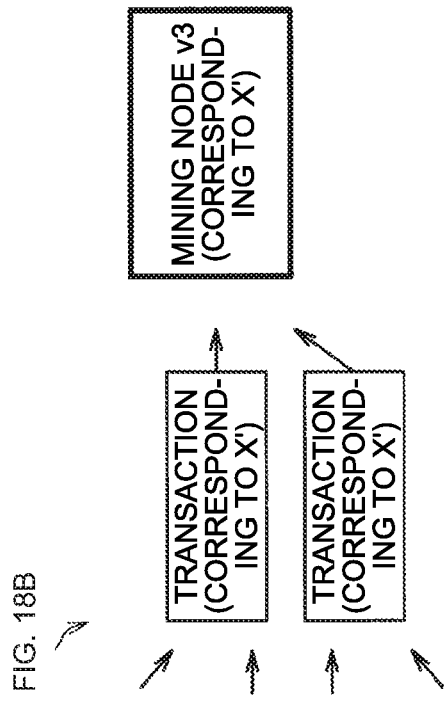
FIGS. 18A and 18B are explanatory diagrams illustrating a seventh example of the operations of the apparatuses constituting the information processing system according to the present embodiment.
Figure 18B:
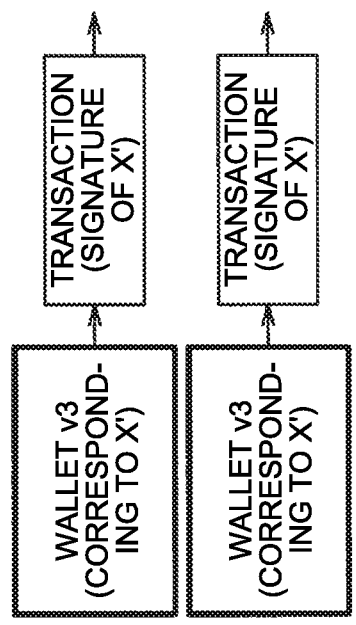

FIGS. 18A and 18B are explanatory diagrams illustrating a seventh example of the operations of the apparatuses constituting the information processing system 1000 according to the present embodiment. FIGS. 18A and 18B illustrate a "case where the third generation operation mode has been set in all the information processing apparatuses 100 constituting the information processing system 1000 and the third verification operation mode has been set in all the registration apparatuses 200 constituting the information processing system 1000".

FIG. 18A illustrates an example of the operation of the information processing apparatus 100 in which the third generation operation mode has been set. Furthermore, FIG. 18B illustrates an example of the operation of the registration apparatuses 200 in which the third verification operation mode has been set.

In the state of the seventh example illustrated in FIGS. 18A and 18B, the information processing apparatus 100 performs the following operation.

The information processing apparatus 100 transmits transaction data including only data corresponding to the second algorithm.

Furthermore, in the state of the seventh example illustrated in FIGS. 18A and 18B, the registration apparatuses 200 performs the following operation.

In a case where transaction data to be verified is data corresponding to only the algorithm X' (second algorithm), the registration apparatuses 200 verifies the transaction data, similarly to the case where the third verification operation mode has been set.

In a case where transaction data to be verified is not the data corresponding to only the algorithm X' (second algorithm), the registration apparatuses 200 does not process the transaction data.

Examples of the operations of the information processing apparatus 100 and the registration apparatuses 200 in the information processing system 1000 include the first example illustrated in (A) above to the seventh example illustrated in (G) above. Needless to say, the examples of the operations of the information processing apparatus 100 and the registration apparatuses 200 in the information processing system 1000 are not limited to the examples described above.

[4] Configuration of Apparatus Constituting Information Processing System According to the Present Embodiment Next, an example of the configuration of each of the information processing apparatus 100 and the registration apparatuses 200 constituting the information processing system 1000 will be described.

[4-1] Configuration of Information Processing Apparatus 100

Figure 19:
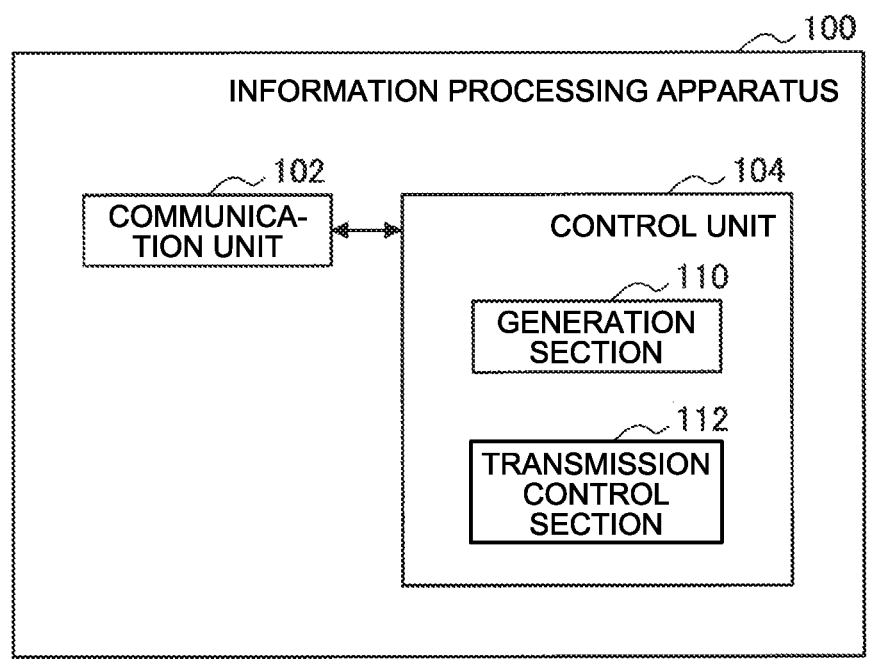
FIG. 19 is a block diagram illustrating an example of a configuration of an information processing apparatus according to the present embodiment.

FIG. 19 is a block diagram illustrating an example of the configuration of the information processing apparatus 100 according to the present embodiment. The information processing apparatus 100 includes, for example, a communication unit 102 and a control unit 104.

Furthermore, the information processing apparatus 100 may include, for example, a ROM (not illustrated), a random-access memory (RAM; not illustrated), a storage unit (not illustrated), an operation unit (not illustrated) that can be operated by a user of the information processing apparatus 100, a display unit (not illustrated) that displays various screens on a display screen thereof, and the like. The information processing apparatus 100 connects the aforementioned components by a bus as a data transmission path, for example.

The ROM (not illustrated) stores therein computer programs to be used by the control unit 104, and control data such as calculation parameters. The RAM (not illustrated) temporarily stores therein computer programs to be executed by the control unit 104, and the like.

The storage unit (not illustrated) is a storage module provided in the information processing apparatus 100, and stores therein, for example, various data such as data according to the information processing method according to the present embodiment, such as data indicating a seed value, and various applications. The storage unit (not illustrated) is, for example, a magnetic recording medium such as a hard disk and a nonvolatile memory such as a flash memory. Furthermore, the storage unit (not illustrated) may be removable from the information processing apparatus 100. Note that the information processing apparatus 100 may not include the storage unit (not illustrated) and various data such as data according to the information processing method according to the present embodiment may be stored in a recording medium outside the information processing apparatus 100.

The operation unit (not illustrated) is an operation input device to be described later. Furthermore, the display unit (not illustrated) is a display device to be described below. Note that the information processing apparatus 100 may not include one or both of the operation unit (not illustrated) and the display unit (not illustrated).

Figure 20:
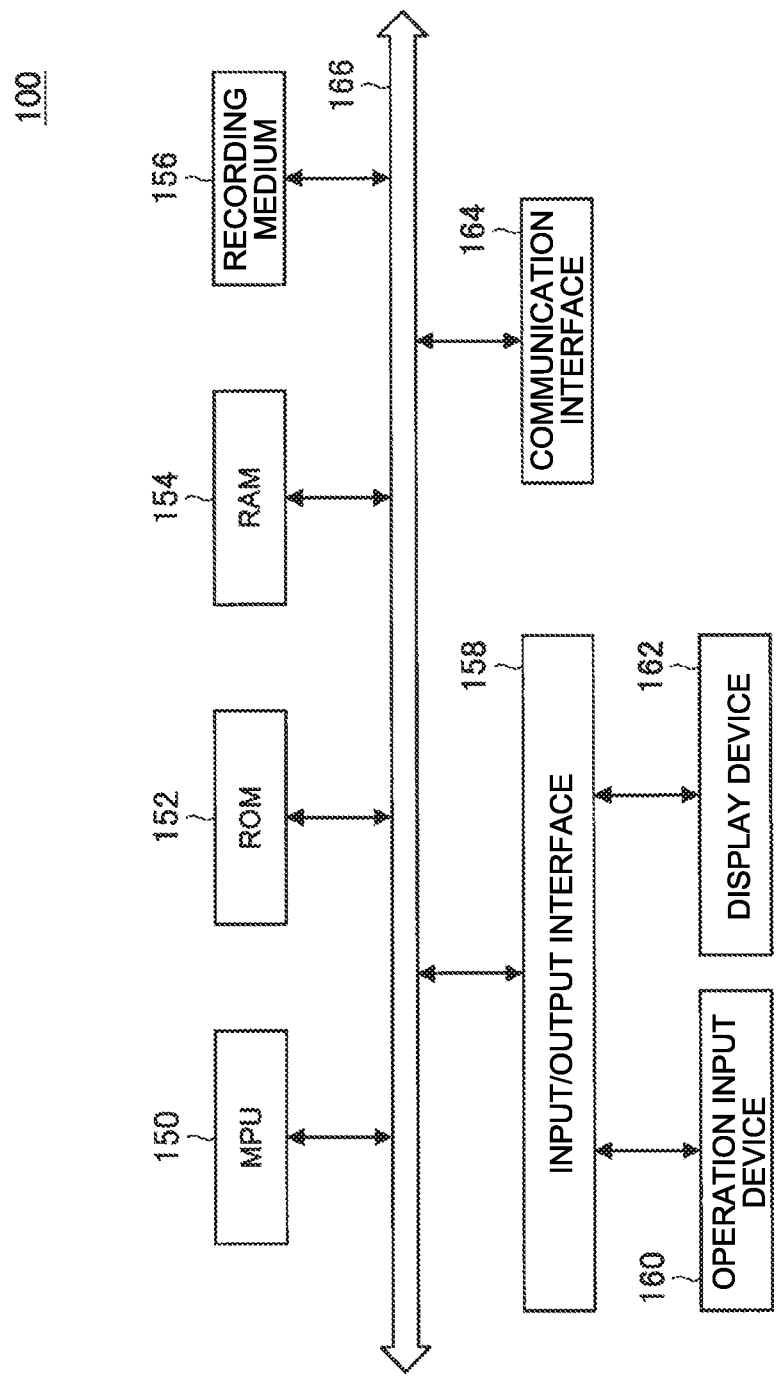
FIG. 20 is an explanatory diagram illustrating an example of a hardware configuration of the information processing apparatus according to the present embodiment.

FIG. 20 is an explanatory diagram illustrating an example of a hardware configuration of the information processing apparatus 100 according to the present embodiment. The information processing apparatus 100 includes, for example, an MPU 150, a ROM 152, a RAM 154, a recording medium 156, an input/output interface 158, an operation input device 160, a display device 162, and a communication interface 164. Furthermore, the information processing apparatus 100 connects the respective components by a bus 166 as a data transmission path, for example. Furthermore, the information processing apparatus 100 is driven by, for example, power supplied from an internal power supply such as a battery provided in the information processing apparatus 100, power supplied from a connected external power supply, and the like.

The MPU 150 includes, for example, one or two or more processors configured with a calculation circuit such as a micro processing unit (MPU), various processing circuits, and the like, and serves as the control unit 104 that controls the entire information processing apparatus 100. Furthermore, the MPU 150 plays a role of, for example, a generation section 110 and a transmission control section 112 to be described later, in the information processing apparatus 100. Note that one or both of the generation section 110 and the transmission control section 112 may be configured with a dedicated (or general purpose) circuit (for example, a processor and the like separated from the MPU 150).

The ROM 152 stores therein computer programs to be used by the MPU 150, control data such as calculation parameters, and the like. The RAM 154 temporarily stores therein, for example, computer programs to be executed by the MPU 150, and the like.

The recording medium 156 serves as the storage unit (not illustrated) and stores therein, for example, various data such as data according to the information processing method according to the present embodiment and various applications. The recording medium 156 is, for example, a magnetic recording medium such as a hard disk and a nonvolatile memory such as a flash memory. Furthermore, the recording medium 156 may be removable from the information processing apparatus 100.

The input/output interface 158 connects, for example, the operation input device 160 and the display device 162. The operation input device 160 serves as the operation unit (not illustrated) and the display device 162 serves as the display unit (not illustrated). The input/output interface 158 is, for example, a universal serial bus (USB) terminal, a digital visual interface (DVI) terminal, a high-definition multimedia interface (HDMI) (registered trademark) terminal, various processing circuits, and the like.

Furthermore, the operation input device 160 is provided on, for example, the information processing apparatus 100, and is connected to the input/output interface 158 inside the information processing apparatus 100. The operation input device 160 is, for example, a button, a direction key, a rotator selector such as a jog dial, a combination thereof, and the like.

Furthermore, the display device 162 is provided on, for example, the information processing apparatus 100, and is connected to the input/output interface 158 inside the information processing apparatus 100. The display device 162 includes, for example, a liquid crystal display, an organic EL display, and the like.

Needless to say, the input/output interface 158 can also be connected to an external device such as an operation input device (for example, a keyboard, a mouse, and the like), a display device, and the like outside the information processing apparatus 100. Furthermore, the display device 162 may be a device, which can perform display and user operation, such as a touch panel, for example.

The communication interface 164 is a communication module provided in the information processing apparatus 100, and serves as the communication unit 102 for performing wireless or wired communication with the registration apparatus 200 and an external apparatus, such as an apparatus other than the apparatuses constituting the information processing system 1000. The communication interface 164 includes, for example, a communication antenna and a radio frequency (RF) circuit (wireless communication), an IEEE 802.15.1 port and a transmission/reception circuit (wireless communication), an IEEE 802.11 port and a transmission/reception circuit (wireless communication), a LAN terminal and a transmission/reception circuit (wired communication), and the like. Furthermore, the communication interface 164 may be any configuration capable of communicating with apparatuses configuring the network 300.

The information processing apparatus 100 performs the processes according to the information processing method according to the present embodiment described above by, for example, the configuration illustrated in FIG. 20. Note that the hardware configuration of the information processing apparatus 100 according to the present embodiment is not limited to the configuration illustrated in FIG. 20.

For example, the information processing apparatus 100 may not include the communication interface 164 when communicating with an external apparatus and the like via a connected external communication device. Furthermore, the communication interface 164 may be configured to be able to communicate with one or two or more external apparatuses by a plurality of communication schemes.

Furthermore, the information processing apparatus 100 can have a configuration that does not include, for example, some or all of the recording medium 156, the operation input device 160, and the display device 162.

Furthermore, the information processing apparatus 100 can have a configuration according to an application example of the information processing apparatus 100, which will be described below, for example.

Furthermore, for example, some or all of the configuration illustrated in FIG. 20 (or a configuration according to a modified example) may be implemented with one or two or more integrated circuits (ICs).

With reference again to FIG. 19, an example of the configuration of the information processing apparatus 100 will be described. The communication unit 102 is a communication module provided in the information processing apparatus 100, and performs wireless or wired communication with an external apparatus. Furthermore, the communication unit 102 can also perform wireless or wired communication with an apparatus other than the apparatuses constituting the information processing system 1000. The communication by the communication unit 102 is controlled by the control unit 104, for example.

The communication unit 102 is, for example, a communication antenna and an RF circuit, a LAN terminal and a transmission/reception circuit, and the like; however, the configuration of the communication unit 102 is not limited to the above. For example, the communication unit 102 can have a configuration corresponding to any standard capable of performing communication of a USB terminal, a transmission/reception circuit, and the like, and any configuration capable of communicating with the apparatuses configuring the network 300. Furthermore, the communication unit 102 may be configured to be able to communicate with one or two or more external apparatuses by a plurality of communication schemes.

The control unit 104 is configured with, for example, an MPU and the like, and plays a role of controlling the entire information processing apparatus 100. Furthermore, the control unit 104 has, for example, the generation section 110 and the transmission control section 112, and plays a leading role in performing the processes according to the information processing method according to the present embodiment.

The generation section 110 plays a role of performing the above process (1) (generation process).

The generation section 110 generates a plurality of public keys, a plurality of addresses, and a plurality of electronic signatures by using each of a plurality of algorithms including the algorithm (second algorithm) that is not solved in the polynomial time.

Furthermore, the generation section 110 may generate a public key, an address, and an electronic signature by using an algorithm corresponding to set generation operation modes. The generation operation modes include, for example, the first generation operation mode, the second generation operation mode, and the third generation operation mode as described above.

The transmission control section 112 plays a role of performing the above process (2) (transmission control process) and allows transaction data including the generated public keys, addresses, and electronic signatures to be transmitted to the P2P network.

The control unit 104 performs the processes according to the information processing method according to the present embodiment by including the generation section 110 and the transmission control section 112, for example.

Note that the configuration of the control unit 104 is not limited to the example illustrated in FIG. 19.

For example, the control unit 104 can have a configuration divided according to the dividing method of the processes according to the information processing method according to the present embodiment.

The information processing apparatus 100 performs the processes according to the information processing method according to the present embodiment described above by, for example, the configuration illustrated in FIG. 19, and transmits transaction data to the P2P network.

Note that the configuration of the information processing apparatus according to the present embodiment is not limited to the configuration illustrated in FIG. 19.

For example, the information processing apparatus according to the present embodiment can include one or both of the generation section 110 and the transmission control section 112 illustrated in FIG. 19, separately from the control unit 104 (for example, one or both of the generation section 110 and the transmission control section 112 can be implemented with a separate processing circuit).

Furthermore, for example, when communicating with an external apparatus via an external communication device having a function and a configuration similar to those of the communication unit 102, the information processing apparatus according to the present embodiment may not include the communication unit 102.

Furthermore, the information processing apparatus according to the present embodiment may further include components (for example, a verification section and a registration section included in the registration apparatus 200, which will be described later) capable of performing the processes according to the registration method according to the present embodiment. In such a case, the information processing apparatus according to the present embodiment can serve as the registration apparatus 200.

[4-2] Application Example of Information Processing Apparatus 100

So far, the information processing apparatus 100 has been described as the present embodiment; however, the present embodiment is not limited to such an embodiment. The information processing apparatus 100 can be applied to, for example, any device, such as a "computer such as a personal computer (PC) and a server", a "smart phone", "any wearable device", a "tablet-type device", a "game machine", and "any movable body such as an automobile", capable of performing the processes according to the information processing method according to the present embodiment described above. Furthermore, the above-described apparatus according to the present embodiment can also be applied to, for example, an IC that can be incorporated in the apparatus as described above.

Furthermore, the information processing apparatus according to the present embodiment may also be applied to a processing system based on connection to a network (or communication between apparatuses), such as cloud computing, for example. An example of the aforementioned processing system includes, for example, a "system in which some of the processes according to the information processing method is performed by one apparatus constituting the processing system and processes other than such some of the processes in the processes according to the information processing method are performed by another apparatus constituting the processing system".

[4-3] Configuration of Registration Apparatus 200

Figure 21:
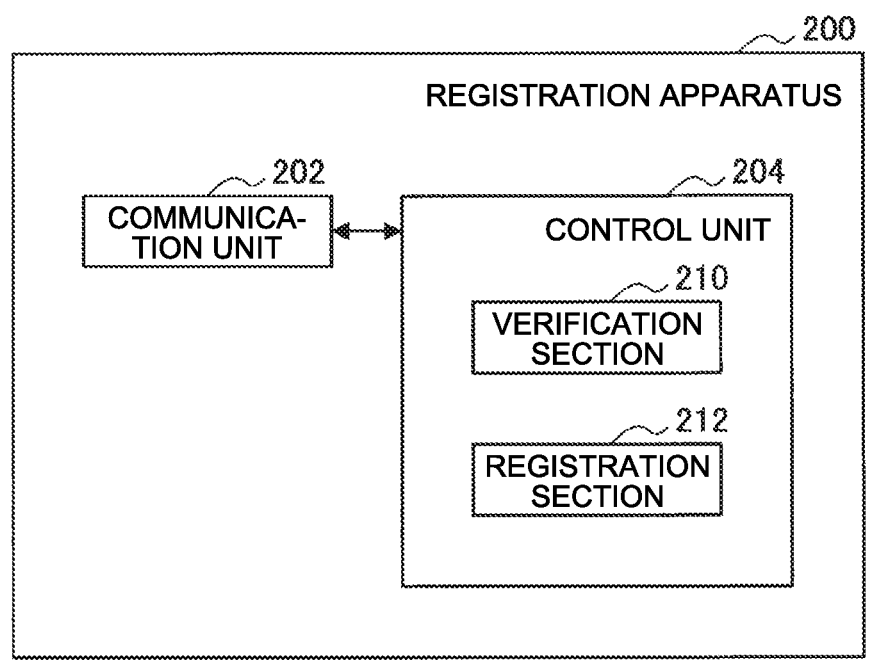
FIG. 21 is a block diagram illustrating an example of a configuration of the registration apparatus according to the present embodiment.

FIG. 21 is a block diagram illustrating an example of the configuration of the registration apparatus 200 according to the present embodiment. The registration apparatus 200 includes, for example, a communication unit 202 and a control unit 204.

Furthermore, the registration apparatus 200 may include, for example, a ROM (not illustrated), a RAM (not illustrated), a storage unit (not illustrated), an operation unit (not illustrated) that can be operated by a user of the registration apparatus 200, a display unit (not illustrated) that displays various screens on a display screen thereof, and the like. The registration apparatus 200 connects the aforementioned components by a bus as a data transmission path, for example.

The ROM (not illustrated) stores therein computer programs to be used by the control unit 204, and control data such as calculation parameters. The RAM (not illustrated) temporarily stores therein computer programs to be executed by the control unit 204, and the like.

The storage unit (not illustrated) is a storage module provided in the registration apparatus 200, and stores therein, for example, various data such as data according to the registration method according to the present embodiment and various applications. The storage unit (not illustrated) is, for example, a magnetic recording medium such as a hard disk and a nonvolatile memory such as a flash memory. Furthermore, the storage unit (not illustrated) may be removable from the registration apparatus 200. Note that the registration apparatus 200 may not include the storage unit (not illustrated) and various data such as data according to the registration method according to the present embodiment may be stored in a recording medium outside the registration apparatus 200.

The operation unit (not illustrated) is, for example, a device similar to the operation input device 160 illustrated in FIG. 20. Furthermore, the display unit (not illustrated) is, for example, a device similar to the display device 162 illustrated in FIG. 20. Note that the registration apparatus 200 may not include one or both of the operation unit (not illustrated) and the display unit (not illustrated).

The registration apparatus 200 has, for example, a hardware configuration (also including a modified example) similar to that of the information processing apparatus 100 illustrated in FIG. 20. The processes in the registration apparatus 200 are performed by, for example, a processor such as the MPU 150 illustrated in FIG. 20. The registration apparatus 200 is driven by, for example, power supplied from an internal power supply such as a battery provided in the registration apparatus 200, power supplied from a connected external power supply, and the like. Note that the hardware configuration of the registration apparatus 200 according to the present embodiment is not limited to the hardware configuration similar to the information processing apparatus 100 illustrated in FIG. 20. For example, the registration apparatus 200 can have a configuration according to an application example of the registration apparatus 200, which will be described later.

The communication unit 202 is a communication module provided in the registration apparatus 200, and performs wireless or wired communication with an external apparatus. Furthermore, the communication unit 202 can also perform wireless or wired communication with an apparatus other than the apparatuses constituting the information processing system 1000. The communication in the communication unit 202 is controlled by the control unit 204, for example.

The communication unit 202 is, for example, a communication antenna and an RF circuit, a LAN terminal and a transmission/reception circuit, and the like; however, the configuration of the communication unit 202 is not limited to the above. For example, the communication unit 202 can have a configuration corresponding to any standard capable of performing communication of a USB terminal, a transmission/reception circuit, and the like, and any configuration capable of communicating with the apparatuses configuring the network 300. Furthermore, the communication unit 202 may be configured to be able to communicate with one or two or more external apparatuses by a plurality of communication schemes.

The control unit 204 is configured with, for example, an MPU and the like, and plays a role of controlling the entire registration apparatus 200. Furthermore, the control unit 204 has, for example, a verification section 210 and a registration section 212, and plays a leading role in performing the processes according to the registration method according to the present embodiment.

The verification section 210 plays a role of performing the above process (I) (verification process), and verifies transaction data transmitted from an external apparatus to the P2P network. The verification section 210 performs verification by methods corresponding to set verification operation modes, for example. At this time, the verification section 210 may not verify transaction data not corresponding to the set verification operation modes, as exemplified in the operation examples illustrated in FIG. 12A, 12B, 13A, 13B, 14A, 14B, 15A, 15B, 16A, 16B, 17A, 17B, 18A, and 18B, for example.

The registration section 212 plays a role of performing the above process (II) (registration process) and registers the verified transaction data in the P2P database.

The control unit 204 performs the processes according to the registration method according to the present embodiment by including the verification section 210 and the registration section 212, for example.

Note that the configuration of the control unit 204 is not limited to the example illustrated in FIG. 21.

For example, the control unit 204 can have a configuration divided according to the dividing method of the processes according to the registration method according to the present embodiment.

The registration apparatus 200 performs the processes according to the registration method according to the present embodiment described above with, for example, the configuration illustrated in FIG. 21, verifies transaction data, and registers the verified transaction data in the P2P database.

Note that the configuration of the registration apparatus according to the present embodiment is not limited to the configuration illustrated in FIG. 21.

For example, the registration apparatus according to the present embodiment can include one or both of the verification section 210 and the registration section 212 illustrated in FIG. 21, separately from the control unit 204 (for example, one or both of the verification section 210 and the registration section 212 can be implemented with a separate processing circuit).

Furthermore, for example, when communicating with an external apparatus via an external communication device having a function and a configuration similar to those of the communication unit 202, the registration apparatus according to the present embodiment may not include the communication unit 202.

Furthermore, the registration apparatus according to the present embodiment may further include components (for example, the generation section 110 and the transmission control section 112 included in the information processing apparatus 100) capable of performing the processes according to the information processing method according to the present embodiment. In such a case, the registration apparatus according to the present embodiment can serve as the information processing apparatus 100.

[4-4] Application Example of Registration Apparatus 200

So far, the registration apparatus 200 has been described as the present embodiment; however, the present embodiment is not limited to such an embodiment. The registration apparatus 200 can be applied to, for example, any device, such as a "computer such as a PC and a server", a "smart phone", "any wearable device", a "tablet-type device", a "game machine", and "any movable body such as an automobile", capable of performing the processes according to the registration method according to the present embodiment described above. Furthermore, the above-described apparatus according to the present embodiment can also be applied to, for example, an IC that can be incorporated in the apparatus as described above.

Furthermore, the registration apparatus according to the present embodiment may also be applied to a processing system based on connection to a network (or communication between apparatuses), such as cloud computing, for example. An example of the aforementioned processing system includes, for example, a "system in which some of the processes according to the registration method is performed by one apparatus constituting the processing system and processes other than such some processes in the processes according to the registration method are performed by another apparatus constituting the processing system".

[5] Example of Effect Obtained in Information Processing System According to the Present Embodiment When the information processing system according to the present embodiment is used, for example, the following effects can be obtained. Needless to say, the effects obtained by using the information processing system according to the present embodiment are not limited to examples to be described below.

It is possible to implement a virtual currency system and a blockchain that can withstand the emergence of quantum computers and can be stably used for a long period of time.

It is possible to implement a virtual currency wallet on a small wearable device (Computer Program According to the Present Embodiment)

[I] Computer Program Enabling Serving as Information Processing Apparatus According to the Present Embodiment The computer program for allowing a computer system to serve as the information processing apparatus according to the present embodiment (for example, a computer program capable of performing the function of the generation section 110 and the function of the transmission control section 112) is executed by a processor and the like in the computer system, so that it is possible to implement a more secure P2P database. Examples of the computer system according to the present embodiment include a single computer and a plurality of computers. A series of processes are performed by the computer system according to the present embodiment.

Furthermore, the computer program for allowing the computer system to serve as the information processing apparatus according to the present embodiment is executed by the processor and the like in the computer system, so that it is possible to obtain the effects obtained by the processes according to the information processing method according to the present embodiment described above.

An example of the computer program causing the computer system to serve as the information processing apparatus according to the present embodiment includes a software wallet in a virtual currency system.

[II] Computer Program Enabling Serving as Registration Apparatus According to the Present Embodiment The computer program for allowing the computer system to serve as the registration apparatus according to the present embodiment (for example, a computer program capable of performing the function of the verification section 210 and the function of the registration section 212) is executed by the processor and the like in the computer system, so that it is possible to implement a more secure P2P database.

Furthermore, the computer program for allowing the computer system to serve as the processing apparatus according to the present embodiment is executed by the processor and the like in the computer system, so that it is possible to obtain the effects obtained by the processes according to the registration method according to the present embodiment described above.

An example of the computer program causing the computer system to serve as the registration apparatus according to the present embodiment includes a computer program that performs mining in a virtual currency system.

So far, a preferred embodiment of the present disclosure has been described in detail with reference to the accompanying drawings; however, the technical scope of the present disclosure is not limited to such an embodiment. It is apparent that a person having an ordinary skill in the technical field of the present disclosure can arrive at various modified examples or corrected examples within the scope of the technical idea described in claims, and it is understood that the modified examples or the corrected examples are naturally included in the technical range of the present disclosure.

For example, it is described in the above that the computer program for allowing the computer system to serve as the information processing apparatus according to the present embodiment and the computer program for allowing the computer system to serve as the registration apparatus according to the present embodiment are provided; however, in the present embodiment, recording media storing therein the computer programs, respectively, or a recording medium storing therein the computer programs together can be provided.

The aforementioned configuration illustrates an example of the present embodiment and naturally belongs to the technical scope of the present disclosure.

Furthermore, the effects described in the present specification are merely explanatory or exemplary, and are not restrictive. That is, the technology according to the present disclosure can obtain other effects clear to a person skilled in the art from the description of the present specification together with the aforementioned effects or instead of the aforementioned effects.

Note that the following configurations also belong to the technical scope of the present disclosure.

(1)

An information processing apparatus comprising:

a generation section that generates, from secret keys corresponding to a plurality of respective algorithms, a plurality of public keys corresponding to the respective algorithms, a plurality of addresses corresponding to the respective algorithms, and a plurality of electronic signatures corresponding to the respective algorithms, by using the algorithms, at least one of the algorithms being an algorithm that is not solved in polynomial time; and a transmission control section that allows transaction data including the generated public keys, addresses, and electronic signatures to be transmitted to a peer-to-peer (P2P) network.

(2)

The information processing apparatus according to (1), wherein the secret keys corresponding to the respective algorithms are generated based on one seed value and are different for the respective algorithms.

(3)

The information processing apparatus according to (1) or (2), wherein the generation section generates the public key, the address, and the electronic signature by using an algorithm corresponding to a set generation operation mode, the transmission control section allows the transaction data including the public key, the address, and the electronic signature, which are generated corresponding to the generation operation mode, to be transmitted to the P2P network, and the generation operation mode includes a first generation operation mode of generating only the public key, the address, and the electronic signature corresponding to a first algorithm that is not the algorithm that is not solved in the polynomial time, a second generation operation mode of generating both the public key, the address, and the electronic signature corresponding to the first algorithm and the public key, the address, and the electronic signature corresponding to a second algorithm that is the algorithm that is not solved in the polynomial time, and a third generation operation mode of generating only the public key, the address, and the electronic signature corresponding to the second algorithm.

(4)

The information processing apparatus according to any one of (1) to (3), wherein the algorithm that is not solved in the polynomial time includes at least one of a multivariate quadratic (MQ) algorithm, an NTRU algorithm, an unbalanced oil and vinegar (UOV) algorithm, an XMSS algorithm, and a McEliece algorithm.

(5)

A registration apparatus comprising:

a verification section that verifies transaction data including a public key, an address, and an electronic signature transmitted from an external apparatus to a peer-to-peer (P2P) network; and a registration section that registers the verified transaction data in a P2P database, wherein the transaction data includes one or both of:

a public key, an address, and an electronic signature generated from a secret key by using a first algorithm that is not an algorithm that is not solved in polynomial time; and a public key, an address, and an electronic signature generated from the secret key by using a second algorithm that is the algorithm that is not solved in the polynomial time.

(6)

The registration apparatus according to (5), wherein the verification section performs verification by a method corresponding to a set verification operation mode, and the verification operation mode includes a first verification operation mode of verifying each of the address and the electronic signature corresponding to the first algorithm based on the public key corresponding to the first algorithm, a second verification operation mode of verifying each of the address and the electronic signature corresponding to the first algorithm based on the public key corresponding to the first algorithm and verifying each of the address and the electronic signature corresponding to the second algorithm based on the public key corresponding to the second algorithm, and a third verification operation mode of verifying each of the address and the electronic signature corresponding to the second algorithm based on the public key corresponding to the second algorithm.

(7)

The registration apparatus according to (6), wherein the verification section does not verify the transaction data not corresponding to the set verification operation mode.

(8)

An information processing method executed by an information processing apparatus, the method comprising the steps of:

generating, from secret keys corresponding to a plurality of respective algorithms, a plurality of public keys corresponding to the respective algorithms, a plurality of addresses corresponding to the respective algorithms, and a plurality of electronic signatures corresponding to the respective algorithms, by using the algorithms, at least one of the algorithms being an algorithm that is not solved in polynomial time; and allowing transaction data including the generated public keys, addresses, and electronic signatures to be transmitted to a peer-to-peer (P2P) network.

(9)

A registration method executed by a registration apparatus, the method comprising:

a step of verifying transaction data including a public key, an address, and an electronic signature transmitted from an external apparatus to a peer-to-peer (P2P) network; and a step of registering the verified transaction data in a P2P database, wherein the transaction data includes one or both of:

a public key, an address, and an electronic signature generated from a secret key by using a first algorithm that is not an algorithm that is not solved in polynomial time; and a public key, an address, and an electronic signature generated from the secret key by using a second algorithm that is the algorithm that is not solved in the polynomial time.

(10)

A computer program causing a computer to perform:

a function of generating, from secret keys corresponding to a plurality of respective algorithms, a plurality of public keys corresponding to the respective algorithms, a plurality of addresses corresponding to the respective algorithms, and a plurality of electronic signatures corresponding to the respective algorithms, by using the algorithms, at least one of the algorithms being an algorithm that is not solved in polynomial time; and a function of allowing transaction data including the generated public keys, addresses, and electronic signatures to be transmitted to a peer-to-peer (P2P) network.

(11)

A computer program causing a computer to perform:

a function of verifying transaction data including a public key, an address, and an electronic signature transmitted from an external apparatus to a peer-to-peer (P2P) network; and a function of registering the verified transaction data in a P2P database, wherein the transaction data includes one or both of:

a public key, an address, and an electronic signature generated from a secret key by using a first algorithm that is not an algorithm that is not solved in polynomial time; and a public key, an address, and an electronic signature generated from the secret key by using a second algorithm that is the algorithm that is not solved in the polynomial time.

REFERENCE SIGNS LIST 100 information processing apparatus
102, 202 communication unit
104, 204 control unit
110 generation section
112 transmission control section
200 registration apparatus
210 verification section
212 registration section
300 network
1000 information processing system

The invention claimed is:

1. An information processing apparatus, comprising:
circuitry configured to:
generate a random number sequence from one seed value;
generate a plurality of secret keys based on different portions of the random number sequence;
generate, from the plurality of secret keys corresponding to a plurality of respective algorithms, a plurality of public keys corresponding to the plurality of respective algorithms, a plurality of addresses corresponding to the plurality of respective algorithms, and a plurality of electronic signatures corresponding to the plurality of respective algorithms, by using the plurality of respective algorithms, wherein
at least one algorithm of the plurality of respective algorithms is an algorithm that is not solved in polynomial time, and
each secret key of the plurality of secret keys corresponds to a different algorithm of the plurality of respective algorithms; and
control transmission of transaction data including the generated plurality of public keys, the plurality of addresses, and the plurality of electronic signatures to a peer-to-peer (P2P) network.

2. The information processing apparatus according to claim 1, wherein the circuitry is further configured to:
generate a public key of the plurality of public keys, an address of the plurality of addresses, and an electronic signature of the plurality of electronic signatures by using the algorithm of the plurality of respective algorithms corresponding to a set generation operation mode; and
permit the transmission of the transaction data including the public key, the address, and the electronic signature, which are generated corresponding to the set generation operation mode, to the P2P network, wherein
the set generation operation mode includes a first generation operation mode for the generation of the public key, the address, and the electronic signature corresponding to a first algorithm that is not the algorithm that is not solved in the polynomial time, a second generation operation mode for the generation of both the public key, the address, and the electronic signature corresponding to the first algorithm and the public key, the address, and the electronic signature corresponding to a second algorithm that is the algorithm that is not solved in the polynomial time, and a third generation operation mode for the generation the public key, the address, and the electronic signature corresponding to the second algorithm.

3. The information processing apparatus according to claim 1, wherein the algorithm that is not solved in the polynomial time includes at least one of a multivariate quadratic (MQ) algorithm, an NTRU algorithm, an un-balanced oil and vinegar (UOV) algorithm, an eXtended Merkle Signature Scheme (XMSS) algorithm, and a McEliece algorithm.

4. The information processing apparatus according to claim 1, wherein
the circuitry is further configured to control transmission of operation mode identification information to the P2P network,
the operation mode identification information indicates a generation operation mode in which each of the plurality of public keys, the plurality of addresses, and the plurality of electronic signatures are generated, and
the generation operation mode corresponds to at least one of a first algorithm that is not the algorithm that is not solved in the polynomial time or a second algorithm that is the algorithm that is not solved in the polynomial time.

5. A registration apparatus, comprising:
circuitry configured to:
receive transaction data including operation mode identification information, a public key, an address, and an electronic signature transmitted from an external apparatus to a peer-to-peer (P2P) network, wherein
the operation mode identification information indicates a generation operation mode in which the public key, the address, and the electronic signature are generated, and
the generation operation mode corresponds to at least one of a first algorithm that is not an algorithm that is not solved in polynomial time or a second algorithm that is the algorithm that is not solved in the polynomial time;

determine the transaction data corresponds to a verification operation mode set in the registration apparatus, wherein the verification operation mode corresponds to at least one of the first algorithm or the second algorithm;

verify the transaction data including the public key, the address, and the electronic signature based on the determination that the transaction data corresponds to the verification operation mode; and register the verified transaction data in a P2P database, wherein the transaction data includes one or both of:
a first public key, a first address, and a first electronic signature generated from a secret key by using the first algorithm, or
a second public key, a second address, and a second electronic signature generated from the secret key by using the second algorithm.

6. The registration apparatus according to claim 5, wherein the verification operation mode includes a first verification operation mode for the verification of the address and the electronic signature corresponding to the first algorithm based on the public key corresponding to the first algorithm, a second verification operation mode for the verification of the address and the electronic signature corresponding to the first algorithm based on the public key corresponding to the first algorithm and the verification of the address and the electronic signature corresponding to the second algorithm based on the public key corresponding to the second algorithm, and a third verification operation mode for the verification of the address and the electronic signature corresponding to the second algorithm based on the public key corresponding to the second algorithm.

7. The registration apparatus according to claim 6, wherein the circuitry is further configured to prohibit the verification of the transaction data not corresponding to the verification operation mode set in the registration apparatus.

8. An information processing method, comprising:
in an information processing apparatus:
generating a random number sequence from one seed value;
generating a plurality of secret keys based on different portions of the random number sequence;
generating, from the plurality of secret keys corresponding to a plurality of respective algorithms, a plurality of public keys corresponding to the plurality of respective algorithms, a plurality of addresses corresponding to the plurality of respective algorithms, and a plurality of electronic signatures corresponding to the plurality of respective algorithms, by using the plurality of respective algorithms, wherein
at least one algorithm of the plurality of respective algorithms being is an algorithm that is not solved in polynomial time, and
each secret key of the plurality of secret keys corresponds to a different algorithm of the plurality of respective algorithms; and
controlling transmission of transaction data including the generated plurality of public keys, the plurality of addresses, and the plurality of electronic signatures to a peer-to-peer (P2P) network.

9. A registration method, comprising:
in a registration apparatus:
receiving transaction data including operation mode identification information, a public key, an address, and an electronic signature transmitted from an external apparatus to a peer-to-peer (P2P) network, wherein
the operation mode identification information indicates a generation operation mode in which the public key, the address, and the electronic signature are generated, and
the generation operation mode corresponds to at least one of a first algorithm that is not an algorithm that is not solved in polynomial time or a second algorithm that is the algorithm that is not solved in the polynomial time;
determining the transaction data corresponds to a verification operation mode set in the registration apparatus, wherein the verification operation mode corresponds to at least one of the first algorithm or the second algorithm;
verifying the transaction data including the public key, the address, and the electronic signature based on the determination that the transaction data corresponds to the verification operation mode; and
registering the verified transaction data in a P2P database, wherein the transaction data includes one or both of:
a first public key, a first address, and a first electronic signature generated from a secret key by using the first algorithm, or
a second public key, a second address, and a second electronic signature generated from the secret key by using the second algorithm.

10. A non-transitory computer-readable medium having stored thereon, computer-executable instructions which, when executed by a processor of an information processing apparatus, cause the processor to execute operations, the operations comprising:
generating a random number sequence from one seed value;
generating a plurality of secret keys based on different portions of the random number sequence;
generating, from the plurality of secret keys corresponding to a plurality of respective algorithms, a plurality of public keys corresponding to the plurality of respective algorithms, a plurality of addresses corresponding to the plurality of respective algorithms, and a plurality of electronic signatures corresponding to the plurality of respective algorithms, by using the plurality of respective algorithms, wherein
at least one algorithm of the plurality of respective algorithms bcing is an algorithm that is not solved in polynomial time, and
each secret key of the plurality of secret keys corresponds to a different algorithm of the plurality of respective algorithms; and
controlling transmission of transaction data including the generated plurality of public keys, the plurality of addresses, and the plurality of electronic signatures to a peer-to-peer (P2P) network.

11. A non-transitory computer-readable medium having stored thereon, computer-executable instructions which, when executed by a processor of a registration apparatus, cause the processor to execute operations, the operations comprising:
receiving transaction data including operation mode identification information, a public key, an address, and an electronic signature transmitted from an external apparatus to a peer-to-peer (P2P) network, wherein
the operation mode identification information indicates a generation operation mode in which the public key, the address, and the electronic signature are generated, and the generation operation mode corresponds to at least one of a first algorithm that is not an algorithm that is not solved in polynomial time or a second algorithm that is the algorithm that is not solved in the polynomial time;

determining the transaction data corresponds to a verification operation mode set in the registration apparatus, wherein the verification operation mode corresponds to at least one of the first algorithm or the second algorithm;

verifying the transaction data including the public key, the address, and the electronic signature based on the determination that the transaction data corresponds to the verification operation mode; and a function of registering the verified transaction data in a P2P database, wherein the transaction data includes one or both of:
- a first public key, a first address, and a first electronic signature generated from a secret key by using the first algorithm, or
- a second public key, a second address, and a second electronic signature generated from the secret key by using the second algorithm.

* * * * *